(12) United States Patent
Kushimoto et al.

(10) Patent No.: US 11,267,387 B2
(45) Date of Patent: Mar. 8, 2022

(54) WORK VEHICLE

(71) Applicant: Kubota Corporation, Osaka (JP)

(72) Inventors: Yumi Kushimoto, Sakai (JP);
Masatoshi Sakai, Sakai (JP); Junichi Fujiwara, Sakai (JP); Yusuke Morita, Sakai (JP)

(73) Assignee: Kubota Corporation, Osaka (JP)

( * ) Notice: Subject to any disclaimer, the term of this patent is extended or adjusted under 35 U.S.C. 154(b) by 135 days.

(21) Appl. No.: 16/410,002

(22) Filed: May 13, 2019

(65) Prior Publication Data

US 2019/0359111 A1 Nov. 28, 2019

(30) Foreign Application Priority Data

| May 28, 2018 | (JP) | JP2018-101675 |
| Jun. 21, 2018 | (JP) | JP2018-118110 |
| Jun. 27, 2018 | (JP) | JP2018-121687 |

(51) Int. Cl.
| *B60P 3/42* | (2006.01) |
| *B62D 21/18* | (2006.01) |
| *B60R 19/03* | (2006.01) |
| *B60Q 1/26* | (2006.01) |
| *B62D 33/02* | (2006.01) |
| *B60R 19/52* | (2006.01) |
| *B60Q 1/04* | (2006.01) |
| *B60R 19/50* | (2006.01) |

(Continued)

(52) U.S. Cl.
CPC .............. *B60P 3/42* (2013.01); *B60Q 1/2603* (2013.01); *B60R 19/03* (2013.01); *B60R 19/52* (2013.01); *B62D 21/186* (2013.01); *B62D 33/02* (2013.01); *B60Q 1/0483* (2013.01); *B60Q 1/2626* (2013.01); *B60R 19/18* (2013.01); *B60R 19/50* (2013.01); *B60R 2019/1833* (2013.01); *B60R 2019/505* (2013.01); *B60Y 2200/20* (2013.01); *B62D 23/005* (2013.01)

(58) Field of Classification Search
CPC ......... B60P 3/42; B62D 21/186; B62D 33/02; B62D 23/005; B60Q 1/2603; B60Q 1/2626; B60Q 1/0483; B60R 19/03; B60R 19/52; B60R 2019/505; B60R 19/50; B60R 2019/1833; B60R 19/18; B60Y 2200/20
USPC .................................. 296/115; 293/117, 135
See application file for complete search history.

(56) References Cited

U.S. PATENT DOCUMENTS 5,066,057 A * 11/1991 Furuta ..................... B60R 19/18
293/121
7,306,270 B2 * 12/2007 Helms ..................... B60R 19/52
293/106

(Continued)

FOREIGN PATENT DOCUMENTS

| JP | 5085920 U1 | 7/1975 |
| JP | 561302 U | 1/1981 |

(Continued)

*Primary Examiner* — D Glenn Dayoan
*Assistant Examiner* — Dana D Ivey
(74) *Attorney, Agent, or Firm* — The Webb Law Firm

(57) ABSTRACT

A work vehicle is disclosed that includes a front guard that is provided at a front end portion of a traveling vehicle body and protects the traveling vehicle body, and an auxiliary device that can be attached to and removed from the front guard. The front guard is provided with an attachment portion to which the auxiliary device can be attached and from which the auxiliary device can be removed.

7 Claims, 19 Drawing Sheets

(51) Int. Cl.
 *B60R 19/18* (2006.01)
 *B62D 23/00* (2006.01)

(56) References Cited

U.S. PATENT DOCUMENTS

| | | | | |
|---|---|---|---|---|
| 7,513,545 | B2 * | 4/2009 | Joseph | B60R 19/48 |
| | | | | 180/68.6 |
| 8,220,849 | B2 * | 7/2012 | Beaird, III | B66D 1/28 |
| | | | | 293/115 |
| 8,608,214 | B2 * | 12/2013 | Wallace | B60R 19/50 |
| | | | | 293/117 |
| 8,801,058 | B2 * | 8/2014 | Hanson | B60R 19/52 |
| | | | | 293/115 |
| 8,998,291 | B1 * | 4/2015 | Addis | B60R 19/52 |
| | | | | 296/180.1 |
| 2011/0006553 | A1 * | 1/2011 | Fretz | B60R 19/52 |
| | | | | 293/115 |
| 2013/0187395 | A1 | 7/2013 | Hanson et al. | |
| 2017/0001508 | A1 | 1/2017 | Bessho et al. | |
| 2017/0001658 | A1 | 1/2017 | Takagi et al. | |
| 2018/0043926 | A1 | 2/2018 | Takagi et al. | |

FOREIGN PATENT DOCUMENTS

| | | |
|---|---|---|
| JP | 596550 U | 1/1984 |
| JP | 61163066 A | 7/1986 |
| JP | 713625 U | 3/1995 |
| JP | 2000219148 A | 8/2000 |
| JP | 2001206142 A | 7/2001 |
| JP | 2005112125 A | 4/2005 |
| JP | 2009544529 A | 12/2009 |
| JP | 201713688 A | 1/2017 |
| JP | 201713690 A | 1/2017 |

* cited by examiner

WORK VEHICLE

CROSS-REFERENCE TO RELATED APPLICATIONS

This application claims priority to Japanese Patent Application Nos. 2018-101675, 2018-118110, & 2018-121687, filed May 28, 2018, Jun. 21, 2018, and Jun. 27, 2018, respectively, the disclosures of which are hereby incorporated by reference in their entirety.

BACKGROUND OF THE INVENTION

1. Field of the Invention

The present invention relates to a work vehicle. More specifically, the present invention relates to a multipurpose work vehicle, which is also called a utility vehicle, but is not limited thereto.

2. Description of the Related Art (1) First Related Art

JP 2017-013688 A (or counterpart application US 2017/0001658 A1 and its divisional application US 2018/0043926 A1) describes a work vehicle equipped with a front guard at a front end portion of the vehicle body. The front guard prevents damage to a hood or the like of the vehicle body as a result of the vehicle colliding with an obstruction, such as a tree or a ridge, in the case where the vehicle is traveling on uneven ground where the surface of the traveling road is uneven and there are trees, weeds, or the like, for example.

This kind of work vehicle is equipped with auxiliary devices using a front guard for protecting the vehicle body. Examples of the auxiliary devices may include a front bumper, which is made of a buffer material, such as a synthetic resin or rubber, for mitigating an impact of a collision with an obstruction, an under guard for preventing a lower portion of the vehicle body from colliding with a protrusion or the like on the ground surface and being damaged, and the like. Conventionally, each of these auxiliary devices is mounted in a state where the main body of the device, a member for attachment, or the like is integrally connected to the front guard by means of welding or the like.

The above-described conventional configuration is advantageous in that each auxiliary device is integrally connected to the front guard and is thus firmly supported by the front guard. However, in the case of this kind of work vehicle, there may be cases where a user wants to use an auxiliary device of a type that differs from an auxiliary device that is mounted, in advance, on the front guard, according to differences in the use situation.

The above-described conventional configuration, however, is disadvantageous in that, for example, an auxiliary device that is mounted, in advance, on the front guard cannot be removed, and another type of auxiliary device cannot be attached to the front guard.

It is desirable to enable an auxiliary device suitable for the use situation to be mounted on the vehicle body.

(2) Second Related Art

JP 2000-219148 A describes a vehicle with a carrier tray. In this vehicle, the carrier tray is supported from below by a beam framework that has a plurality of members. The beam framework is formed by joining and integrating a plurality of frame members that have the same shape with each other by means of welding. JP 2000-219148 A also describes another beam framework, in which a plurality of elongated members are vertically and horizontally arranged in a lattice and are joined to each other by means of welding.

In such a beam framework, stress is likely to concentrate at portions at which the members that support the carrier tray are welded to each other. Particularly, in a beam framework in which a plurality of elongated members are vertically and horizontally arranged in a lattice and are joined to each other by means of welding, the plurality of members are welded to each other at intersecting portions, and thus stress concentrates at these welded portions.

Thus there is a demand for a carrier tray capable of mitigating concentration of stress, and a work vehicle that includes such a carrier tray.

SUMMARY OF THE INVENTION

[1] The following work vehicle is proposed corresponding to the first related art.

A work vehicle comprising:
a traveling vehicle body;
a front guard configured to protect the traveling vehicle body, the front guard being provided at a front end portion of the traveling vehicle body; and
an auxiliary device capable of being attached to and removed from the front guard,
wherein the front guard is provided with an attachment portion to which the auxiliary device can be attached and from which the auxiliary device can be removed.

According to this configuration, an auxiliary device suitable for the situation where the work vehicle is used can be attached to the attachment portion with which the front guard is provided. In the case where the work vehicle is used in a use situation where the aforementioned auxiliary device does not need to be used, such a situation can be dealt with by removing the auxiliary device from the attachment portion.

Accordingly, the auxiliary device suitable for the use situation can be mounted in a state of being firmly supported by a vehicle body front portion, using a robust front guard for protecting the vehicle body.

In a preferable embodiment, the auxiliary device is a front bumper that is made of a buffer material.

According to this configuration, even if the vehicle accidentally collides with an obstruction, the impact can be mitigated by the front bumper that is provided in the vehicle body front portion and is made of a buffer material.

In a preferable embodiment, the auxiliary device is a direction indicator configured to indicate a direction in which the traveling vehicle body turns.

According to this configuration, a work vehicle that travels on a road can be provided with the direction indicator in a state of being firmly supported by the front guard.

In a preferable embodiment, the auxiliary device is a work lamp.

According to this configuration, a work vehicle that performs work at night can be provided with the work lamp in a state of being firmly supported by the front guard.

In a preferable embodiment, the auxiliary device is an under guard configured to protect a lower portion of the traveling vehicle body.

According to this configuration, in the case where the work vehicle travels on a working ground where the surface of a traveling road is uneven and there is a concern that a lower portion of the vehicle body will come into contact with a projecting portion on the road surface, this work vehicle can be provided with the under guard in a state of being firmly supported by the front guard.

In a preferable embodiment, the auxiliary device is a bush guard configured to guide weeds toward a vehicle body lower side.

According to this configuration, a work vehicle that travels in an area where many weeds or the like are overgrown can be provided with a bush guard in a state of being firmly supported by the front guard. Overgrown weeds or the like can be kept from entering the vehicle body from the vehicle body front side and being entangled with the vehicle body, by providing the bush guard.

In a preferable embodiment, the auxiliary device is at least two of a front bumper that is made of a buffer material, a direction indicator configured to indicate a direction in which the traveling vehicle body turns, a work lamp, an under guard configured to protect a lower portion of the traveling vehicle body, and a bush guard configured to guide weeds toward a vehicle body lower side.

According to this configuration, even in a work situation that requires two or more of the front bumper, the direction indicator, the work lamp, the under guard, and the bush guard, the work vehicle can travel for work in a state suitable for such a situation.

[2] The following work vehicle is proposed corresponding to the second related art.

A carrier tray comprising:

a bottom plate having a goods loading surface onto which goods are loaded; and a beam framework having a plurality of members configured to take on a load applied to the bottom plate, the beam framework being located below the bottom plate, wherein the beam framework has an upper beam member and a lower beam member, and a fitting groove in which the upper beam member and the lower beam member are fitted to each other is formed at an intersecting portion of at least one of the upper beam member and the lower beam member; and a fixing member provided at the intersecting portion and fixed to both the upper beam member and the lower beam member.

According to the above configuration, in the beam framework, not only are the upper beam member and the lower beam member fitted and fixed to each other at the portion of the fitting groove, but also is the fixing member fixed to both the upper beam member and the lower beam member at the intersecting portion. That is to say, the upper beam member and the lower beam member are fixed not only at the portion of the fitting groove but also via the fixing member. As a result, stress is also applied to portions of the upper beam member and the lower beam member that come into contact with the fixing member, and thus, stress does not concentrate at the periphery of the portion of the fitting groove at which the upper beam member and the lower beam member are directly fixed to each other.

Accordingly, a carrier tray capable of mitigating concentration of stress can be provided.

In a preferable embodiment, the fitting groove is formed in the lower beam member, and the fixing member has a semi-tubular portion extending in a longitudinal direction of the upper beam member so as to cover a lateral side face of the upper beam member.

According to the above configuration, the semi-tubular portion that has a shape with a robust structure is fixed to the upper beam member, in a state of covering the side face of the upper beam member, and is also fixed to the lower beam member. That is to say, the upper beam member and the lower beam member can be fixed to each other via the fixing member that has a robust structure.

In a preferable embodiment, the fixing member has an extending portion extending in the longitudinal direction of the upper beam member from the semi-tubular portion, and the extending portion has a flat plate-like shape whose width in the vertical direction decreases as it extends away from the intersecting portion.

According to the above configuration, the extending portion that constitutes the fixing member is thinner, i.e. is structurally weaker as it extends away from the intersecting portion. As a result, a strong force is not applied to a portion of the upper beam member that is fixed to the extending portion, the portion being away from the intersecting portion, due to the extending portion.

A work vehicle that has a carrier tray with any of the above-described configurations on a traveling vehicle body is also a subject matter of the present invention.

[3] Other features and advantages achieved thereby will be understood by reading the following description.

BRIEF DESCRIPTION OF THE DRAWINGS

FIG. 11 is a perspective view of a beam framework that the carrier tray is provided with;

DETAILED DESCRIPTION OF PREFERRED EMBODIMENTS

All of the embodiments will describe a multipurpose work vehicle (which is also called a utility vehicle) as an example of a work vehicle.

First Embodiment

The first embodiment will be described below with reference to FIGS. 1 to 8.

In the following description, the direction denoted by an arrow F in FIG. 1 indicates the front side, the direction denoted by an arrow B in FIG. 1 indicates the rear side, the direction denoted by an arrow R in FIG. 2 indicates the right side, and the direction denoted by an arrow L in FIG. 2 indicates the left side, unless otherwise stated.

Overall Configuration

Figure 1:
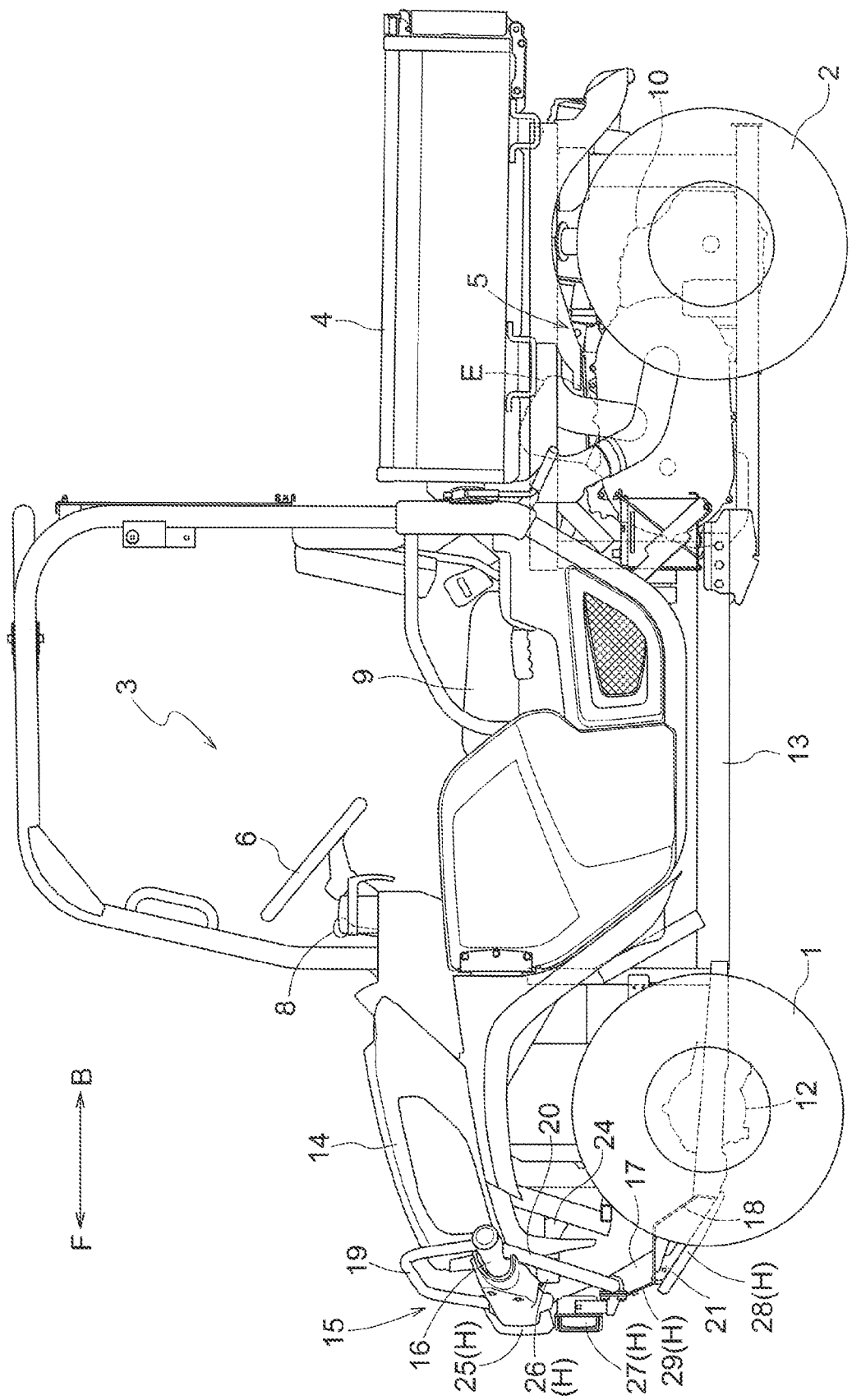
FIG. 1 is an overall side view of a work vehicle according to a first embodiment (the same applies to FIGS. 2 to 8)

A multipurpose work vehicle shown in FIG. 1 is configured as a vehicle that can be used for various purposes, such as transportation of goods and recreation. In this work vehicle, a traveling vehicle body is provided with a pair of right/left front wheels 1, which can be driven and steered, and a pair of right/left rear wheels 2, which can be driven. A driving section 3, in which a driver sits to perform a driving operation, is provided in a center portion of the traveling vehicle body. A carrier tray 4, on which goods can be loaded and which can perform a dumping operation, is provided in a rear portion of the traveling vehicle body. A motive portion 5 is provided below the carrier tray 4.

The driving section 3 is provided with a steering wheel 6 for performing a steering operation for the front wheels 1, a gear shift lever 8 for a gear shift operation, a driver seat 9 on which an occupant can sit, an acceleration pedal (not shown), and so on. The gear shift lever 8 is configured to be switchable between a forward first-speed position, a forward second-speed position, a neutral position, and a reverse position, by being subjected to a pivoting operation.

Figure 2:
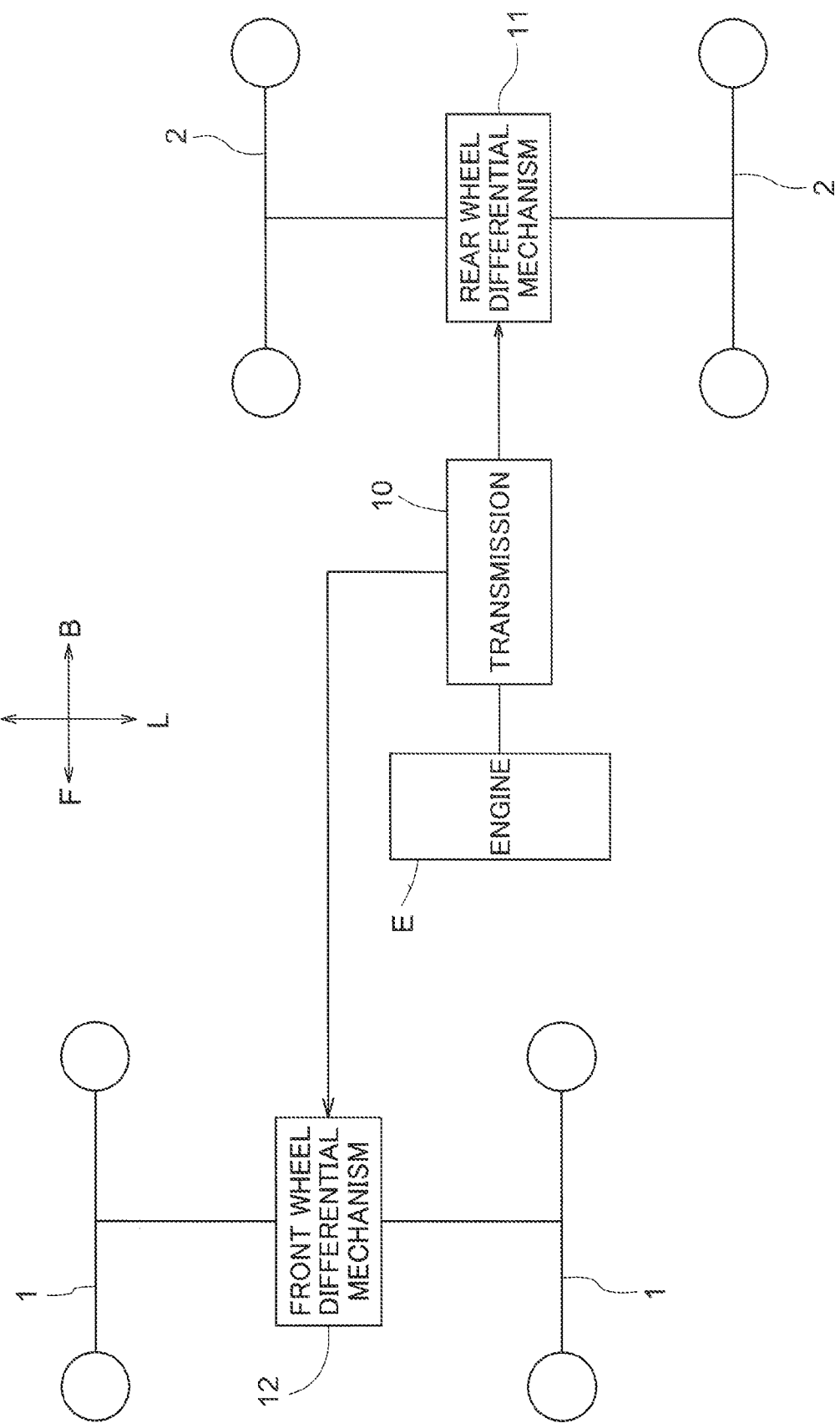
FIG. 2 is a transmission system diagram.

As shown in FIG. 2, the motive portion 5 is provided with a gasoline engine (hereinafter abbreviated as an engine) E, and a transmission 10 for changing the speed of output of the engine E and transmitting the output to the front wheels 1 and the rear wheels 2. Although a specific configuration will not be described in detail, the transmission 10 is switchable between a plurality of transmission gear states with different transmission gear ratios, namely a forward first-speed state, a forward second-speed state, a neutral state, and a reverse state, by operating the gear shift lever 8. In the neutral state, power transmission is cut off, and the traveling vehicle body enters a travel-stop state. Motive power output from the transmission 10 is transmitted to the right/left rear wheels 2 via a rear wheel differential mechanism 11, and is also transmitted to the right/left front wheels 1 via a front wheel differential mechanism 12.

The engine E, the transmission 10, and so on, are supported by a vehicle body frame 13. The vehicle body frame 13 extends in an elongated manner in the front-rear direction from a rear portion to a front portion of the vehicle body.

The front portion of the traveling vehicle body that is located forward of the driving section 3 is provided with a hood 14 that can be opened and closed. A radiator (not shown) for cooling the engine E, and the like are arranged inside the hood 14.

Front Guard

Figure 3:
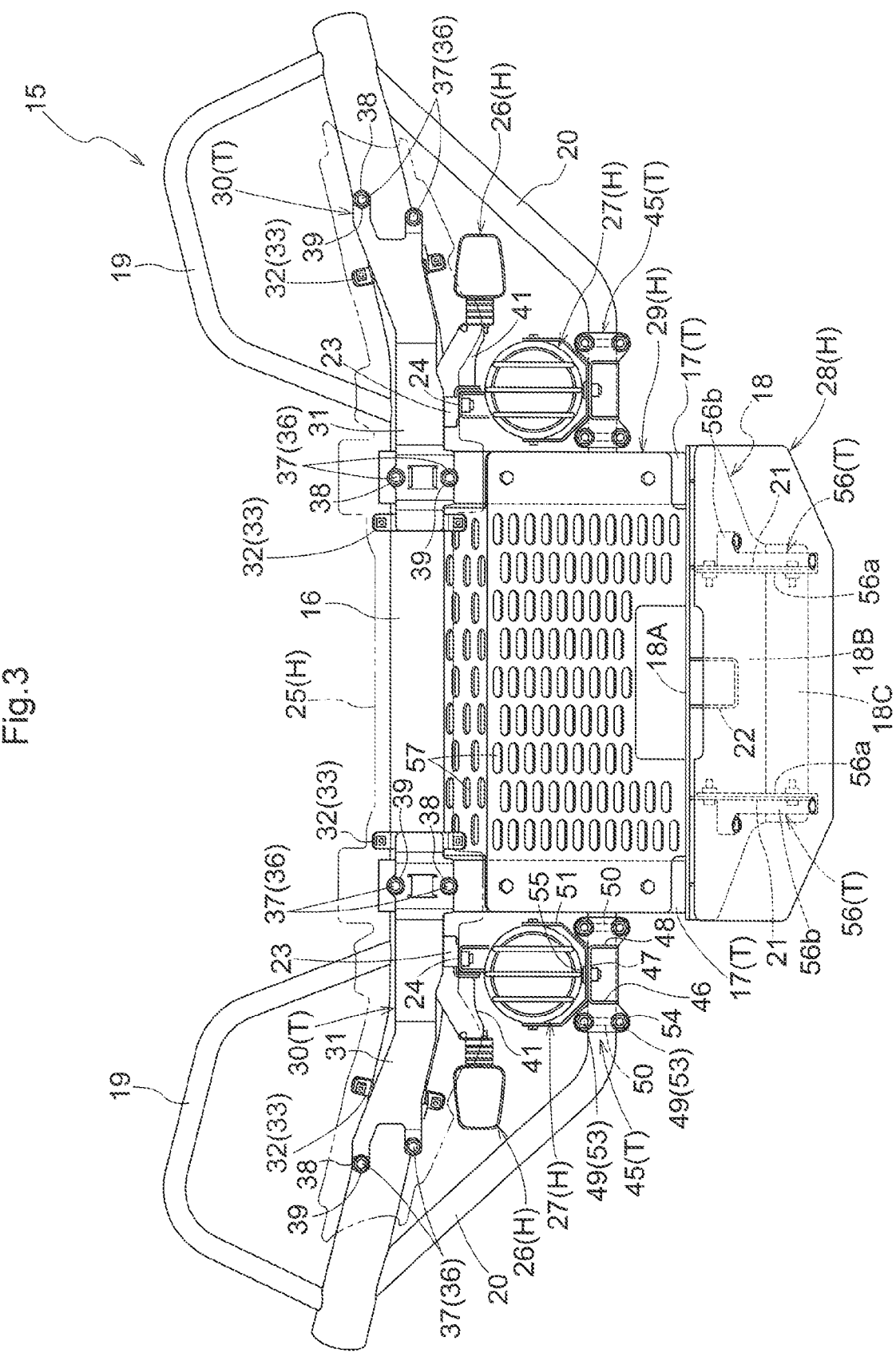
FIG. 3 is a front elevational view of a front guard with a plurality of auxiliary devices mounted thereon.
Figure 5:
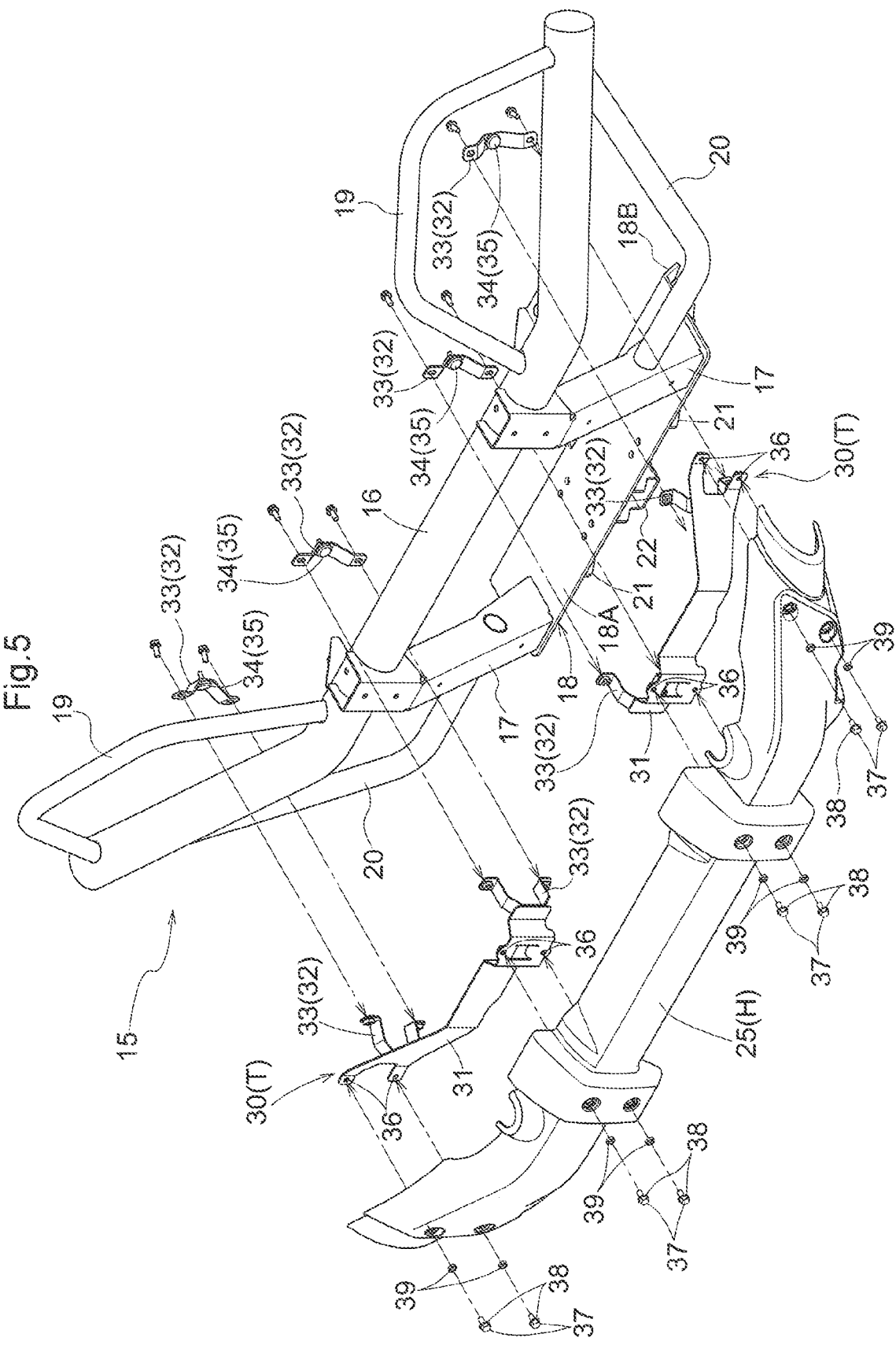
FIG. 5 is a perspective view illustrating a state where a front bumper is attached.

As shown in FIG. 1, a front guard 15 for protecting the vehicle body is provided at a front end portion of the traveling vehicle body, i.e. at a front portion of the hood 14. As shown in FIGS. 3 and 5, the front guard 15 is provided, in an area corresponding to an intermediate position in the vertical direction on the vehicle body front side, with a guard body portion 16, which has a round pipe shape and extends in the lateral direction along a front end edge of the vehicle body, a pair of right/left vertical support portions 17, which extend downward and are connected to intermediate positions, in the lateral direction, of the guard body portion 16, a lateral support portion 18, which extends in the lateral direction and connects lower end portions of the pair of right/left vertical support portions 17, a pair of right/left upper auxiliary guard portions 19, which extend to form upward loop shapes on right/left portions of the guard body portion 16, and a pair of right/left lower auxiliary guard portions 20, which extend to form loop shapes, respectively from right/left end portions of the guard body portion 16 to intermediate portions, in the vertical direction, of the right/left vertical support portions 17.

Each of the right/left vertical support portions 17 is formed to have a substantially U shape as viewed in a plan view. Upper end portions of the right/left vertical support portions 17 are integrally connected to the guard body portion 16 by means of welding, and lower end portions are integrally connected to the lateral support portion 18 by means of welding. A center portion of the guard body portion 16 that is sandwiched by the right/left vertical support portions 17 laterally extends straight. A right portion and a left portion of the guard body portion 16 that are located laterally outward of the center portion are curved obliquely rearward from end portions of the center portion.

Figure 4:
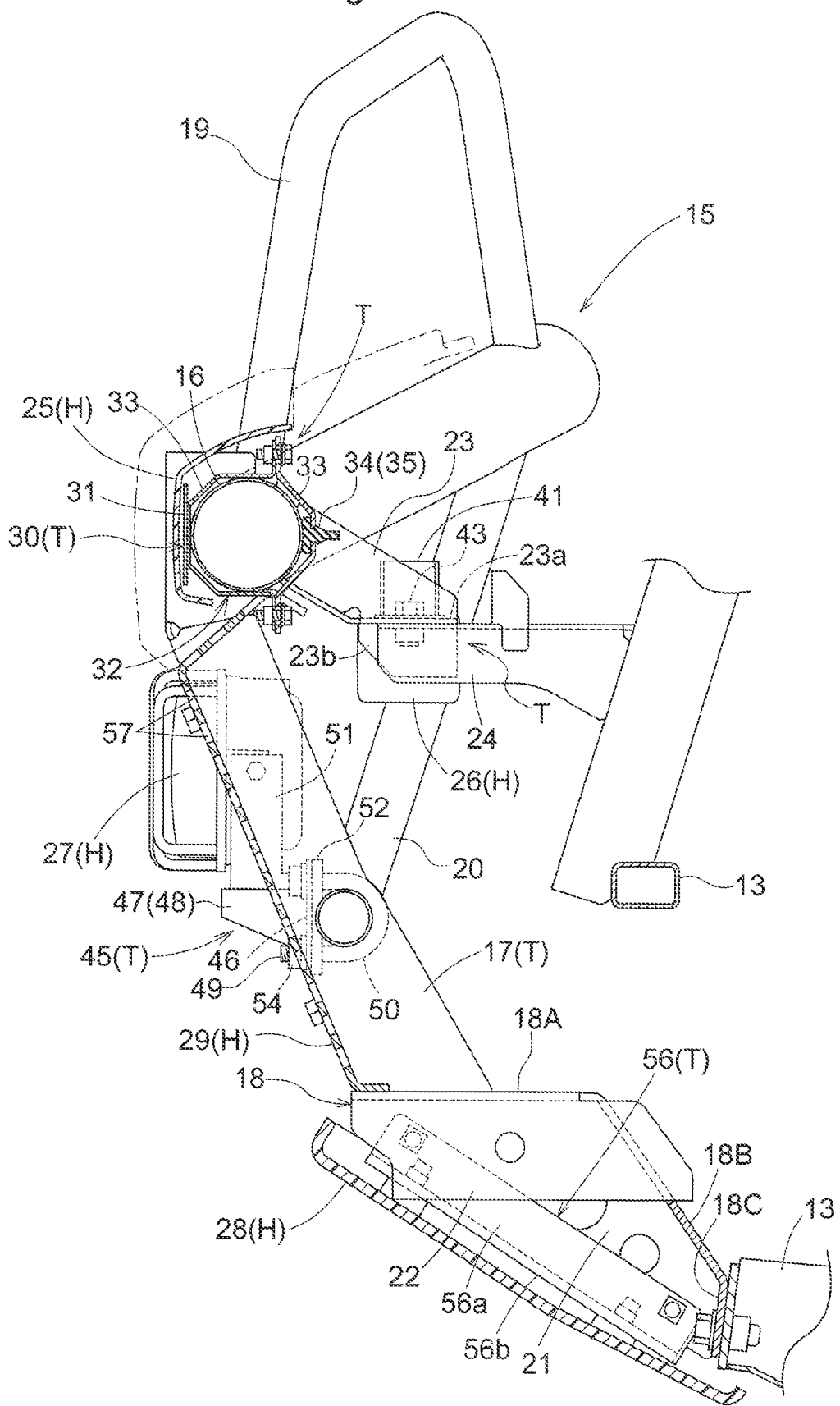
FIG. 4 is a vertical cross-sectional side view of the front guard with a plurality of auxiliary devices mounted thereon.
Figure 8:
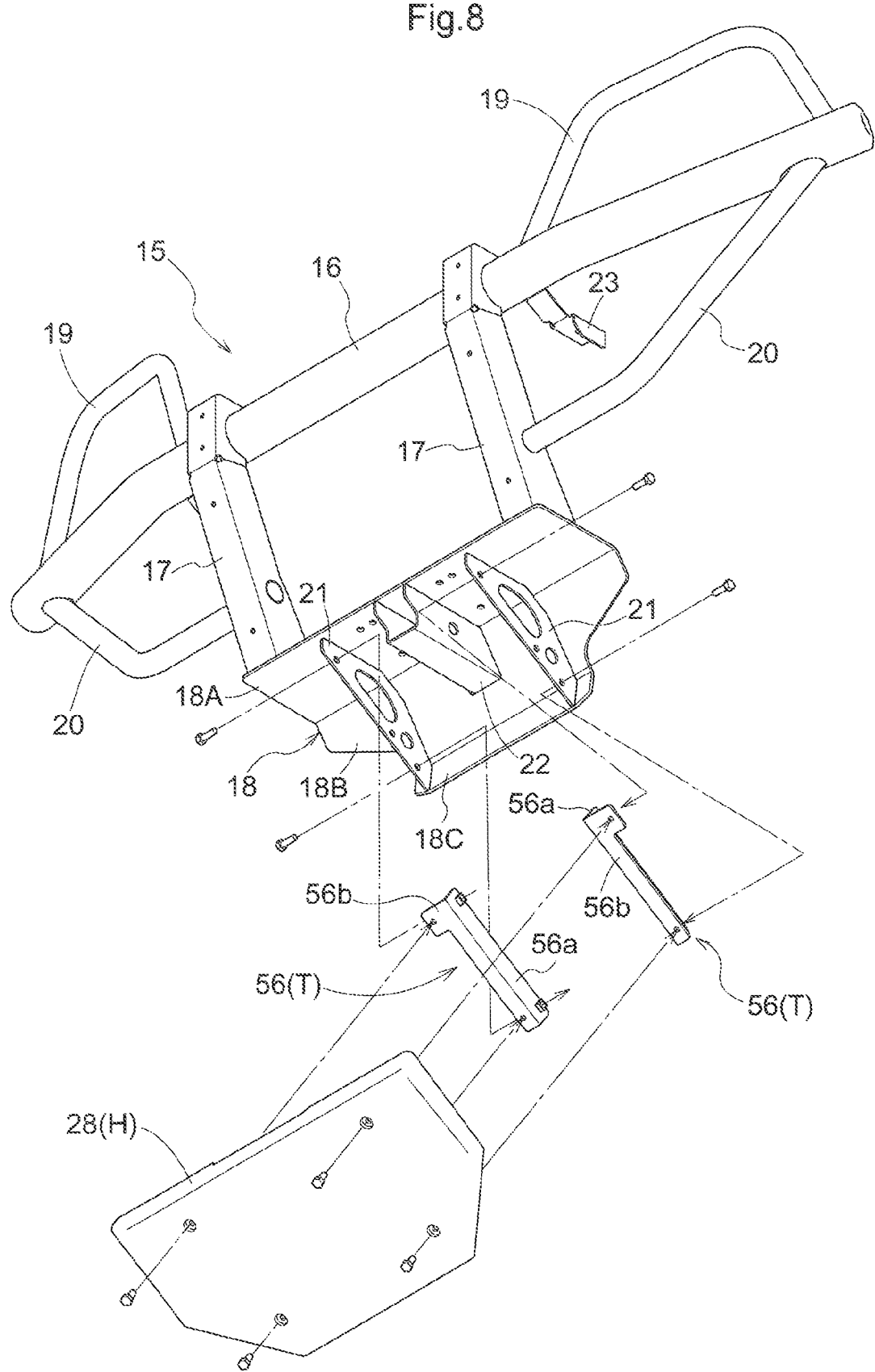
FIG. 8 is a perspective view illustrating a state where an under guard is attached.

As shown in FIGS. 4, 5, and 8, the lateral support portion 18 includes a horizontal face portion 18A, which is provided on the upper side, an inclined face portion 18B, which extends obliquely downward and rearward from a rear end portion of the horizontal face portion 18A, and a vertical face portion 18C, which extends downward from a lower end portion of the inclined face portion 18B. The horizontal face portion 18A, the inclined face portion 18B, and the vertical face portion 18C are provided continuously. The lower end portions of the right/left vertical support portions 17 are integrally connected to an upper face of the horizontal face portion 18A by means of welding.

A pair of plate-shaped reinforcing ribs 21, which extend over lower faces of the horizontal face portion 18A, the inclined face portion 18B, and the vertical face portion 18C, are provided at right/left portions on the lower face side of the lateral support portion 18. A rectangular reinforcing rib 22, which has a substantially U shape as seen from the front and extends in the front-rear direction along the lower face of the horizontal face portion 18A, is provided at a center portion, in the left-right direction, on the lower face side of the lateral support portion 18.

Figure 6:
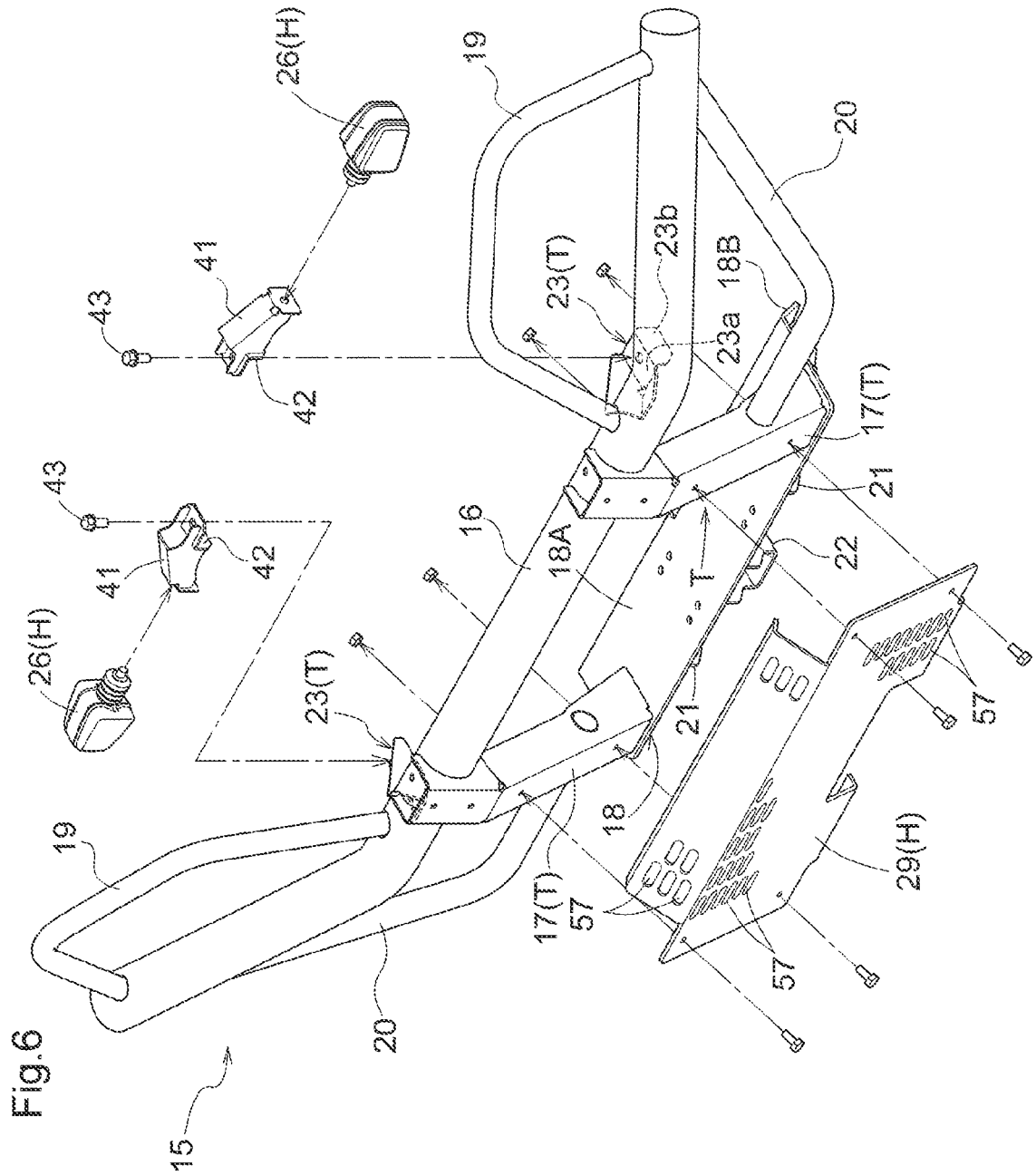
FIG. 6 is a perspective view illustrating a state where a bush guard and direction indicators are attached.

The front guard 15 is supported by being connected to the front side of the vehicle body frame 13 at two portions, namely upper and lower portions, by bolts. That is to say, the vertical face portion 18C of the lateral support portion 18 is connected to the front end portion of the vehicle body frame 13 by bolts, as shown in FIG. 4. Also, as shown in FIGS. 4, 6, and 8, connection brackets 23 extend rearward from portions adjacent, on a laterally outer side, to the portions of the guard body portion 16 to which the vertical support portions 17 are connected, and rear end portions of the connection brackets 23 are connected, by bolts, to connecting portions 24 that are provided at the front end portion of the vehicle body frame 13. The vertical face portion 18C of the lateral support portion 18 corresponds to a lower connecting portion of the front guard 15, and each of the rear end portions of the connection brackets 23 corresponds to an upper connecting portion of the front guard 15.

Regarding Attachment of Auxiliary Devices

The front guard 15 is provided with attachment portions T that auxiliary devices H can be attached to and removed from. A front bumper 25, direction indicators 26, work lamps 27, an under guard 28, and a bush guard 29 can be mounted as the auxiliary devices H.

Attachment Portion for Front Bumper 25

Attachment portions for the front bumper 25, which serves as an auxiliary device H, will be described below.

The front bumper 25 is made of a buffer material, such as a soft synthetic resin or rubber, and has a function of mitigating an impact at the time of collision with an obstruction. As shown in FIG. 5, bumper brackets 30, which are formed to have a substantially L shape so as to extend along right/left bent portions of the guard body portion 16, are attached to these bent portions. Each of the bumper brackets 30 includes a bracket body 31, which extends in the left-right direction, and sandwiching-holding portions 32, which are located at the right/left portions of the bracket body 31 and sandwich and hold the guard body portion 16 from the front and rear sides.

Each of the sandwiching-holding portions 32 is provided with divided plates 33 on the front and rear sides, each of the divided plates 33 having a substantially U shape as seen from the side, and two side end portions of the front and rear divided plates 33 are connected by bolts in a state of sandwiching the guard body portion 16 from the front and rear sides, as shown in FIGS. 4 and 5. The divided plates 33 on the bracket body 31 side are integrally fixed to the bracket body 31 by means of welding. The front and rear divided plates 33 are connected to each other by bolts, with a rubber cushion 34 interposed between the divided plate 33 on the side opposite to the bracket body 31 side and the guard body portion 16. Detent members 35 for preventing rotation around the guard body portion 16 during attachment are provided at portions of the bumper brackets 30 that correspond to the vertical support portions 17, in a state of abutting against the vertical support portions 17.

The front bumper 25 can be attached, with the pair of right/left bumper brackets 30 attached to the guard body portion 16. Bolt insertion holes 36 are formed in the bumper brackets 30 at positions corresponding to the vertical support portions 17 and positions on the laterally outer side. Welding nuts (not shown) are provided on the back side of the bolt insertion holes 36. The front bumper 25 can be fixed by inserting a plurality of bolts 37 into the bolt insertion holes 36 and fastening these bolts 37. Not only the front bumper 25 but also the bumper brackets 30 can be removed by removing the plurality of bolts 37.

As shown in FIGS. 3 and 5, flange bolts, each of which has a large-diameter washer portion 38, are used as the attachment bolts 37 for fixing the front bumper 25. A configuration in which each bolt 37 is fastened via a spacer 39 is employed such that the front bumper 25, which is made of a buffer material, is not crushed as a result of fastening the bolts 37.

Attachment Portion for Direction Indicator 26

Next, attachment portions T for the direction indicators 26, each of which serves as an auxiliary device H, will be described.

The direction indicators 26 are constituted by lamps that flash to indicate a turning direction when the vehicle body travels and turns either left or right. As shown in FIG. 3, the direction indicators 26 are arranged on the right/left sides in a state of being located between the guard body portion 16 and the right/left lower auxiliary guard portions 20 of the front guard 15 as seen from the front.

As shown in FIG. 6, each of the connection brackets 23 provided on the guard body portion 16 is a plate material that is bent into a substantially Z shape as seen from the front. Lamp holders 41 are removably attached to the connection brackets 23. The lamp holders 41 are joined together with the connection brackets 23 to the connecting portions 24, in a state where rectangular recessed portions 42 abut against horizontal face portions 23a and lower vertical face portions 23b of the respective connection brackets 23 such that the orientation of the lamp holders 41 is maintained. The direction indicators 26 can be removed by removing bolts 43.

Attachment Portion for Work Lamp 27

Next, attachment portions T for the work lamps 27, each of which serves as an auxiliary device H, will be described.

The work lamps 27 are illumination lamps for illuminating a working location in front of the vehicle body when work is performed at night, for example. Although these work lamps 27 may not be used when the working mode differs, the work lamps 27 can be removed in such cases.

Figure 7:
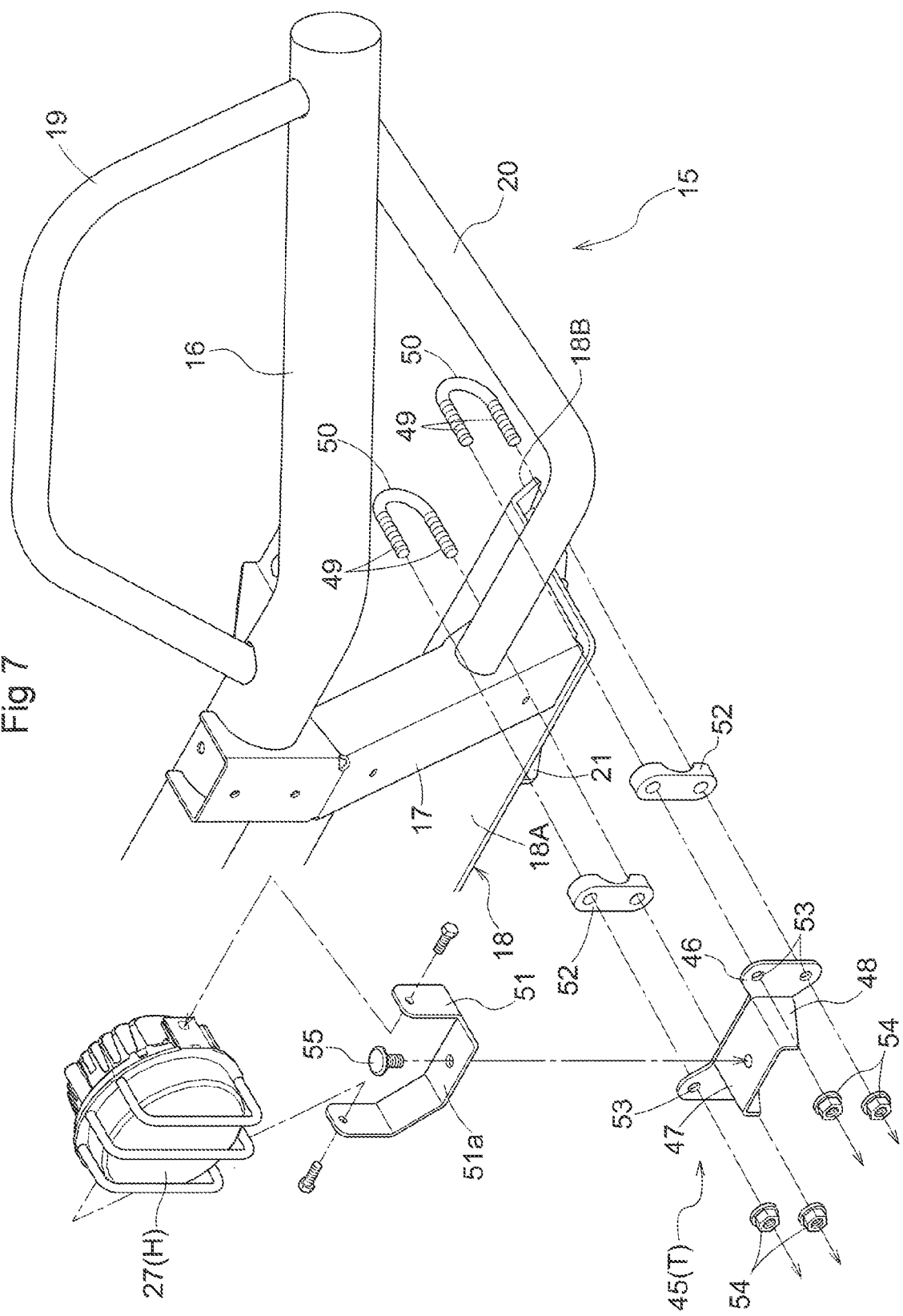
FIG. 7 is a perspective view illustrating a state where a work lamp is attached.

As shown in FIG. 7, the work lamps 27 are removably supported via support mechanisms 45 at positions near portions of the lower auxiliary guard portions 20 that are connected to the vertical support portions 17. Each of the support mechanisms 45 includes a connection bracket 48, which has a connection plate 46 in a vertical orientation and a receiving portion 47 for receiving and supporting a corresponding one of the work lamps 27, a pair of connection members 50, each of which is formed by bending a round bar material into a substantially U shape as seen from the side so as to abut against an outer-circumferential portion of a corresponding one of the lower auxiliary guard portions 20, and on each of which screw portions 49 are formed at straight end portions on two sides, a support stay 51, which has a substantially U shape as seen in the front-rear direction and holds the corresponding one of the work lamps 27, and cushion materials 52, which are interposed between the connection bracket 48 and the outer-circumferential face of the lower auxiliary guard portion 20.

Each of the connection brackets 48 is attached to the lower auxiliary guard portion 20 using the connection plate 46 and the connection members 50 by inserting the screw portions 49 of the pair of connection members 50 into the connection plate 46 in the vertical orientation through a pair of upper and lower insertion holes 53, which are formed in right/left portions of the connection plate 46, with the connection plate 46 abutting against the outer-circumferential face of the lower auxiliary guard portion 20 via the cushion materials 52, and then fastening the screw portions 49 with nuts 54. A lower placement portion 51a of the support stay 51 for supporting right/left portions of the corresponding one of the work lamps 27 is placed on and supported by the receiving portion 47 of the connection bracket 48, and the support stay 51 and the connection bracket 48 are connected to each other by a bolt 55, which is inserted into the support stay 51 and the connection bracket 48 in the vertical direction. Each work lamp 27 is thus supported. Each work lamp 27 can be removed by undoing the bolt connection between the connection members 50 and the connection plate 46 or undoing the bolt connection between the support stay 51 and the connection bracket 48.

Attachment Portion for Under Guard 28

Next, an attachment portion T for the under guard 28, which serves as an auxiliary device H, will be described.

The under guard 28 is for avoiding disadvantages, such as a projecting portion or the like on an uneven surface of a traveling road coming into contact with and damaging the front wheel differential mechanism 12 or the like that is provided in the lower portion of the vehicle body.

As shown in FIGS. 4 and 8, connection stays 56 are attached to the pair of plate-shaped reinforcing ribs 21 provided on the lateral support portion 18 of the front guard 15. Each of the connection stays 56 is formed to have a substantially L shape as seen from the front, and a vertical face portion 56a of each of the connection stays 56 is connected to a corresponding one of the reinforcing ribs 21 by bolts. The under guard 28 is attached to a horizontal face 56b of each of the connection stays 56 by means of bolt connection. The under guard 28 is made of a thick metal material for the purpose of avoiding damage to the vehicle body, and has a predetermined strength with which the vehicle body is not readily damaged even if it comes into contact with a projecting portion on the surface of a traveling road. In the case where the under guard 28 is not needed, the under guard 28 can be removed by undoing the bolt connection.

Attachment Portion for Bush Guard 29

Next, an attachment portion T for the bush guard 29, which serves as an auxiliary device H, will be described.

The bush guard 29 can keep overgrown weeds or the like from entering the vehicle body from the vehicle body front side and being entangled with the vehicle body.

As shown in FIGS. 4 and 6, the bush guard 29 is mounted in an area in the front guard 15 below the guard body portion 16, the area being sandwiched by the right/left vertical support portions 17. The bush guard 29 is a plate body in which a large number of insertion holes 57 are formed. Even if tall weeds or the like are present, the bush guard 29 can press down the weeds or the like to guide them toward the lower side of the machine body and keep the weeds or the like from entering the vehicle body from the vehicle body front side, while allowing outside air for cooling the engine to be favorably taken in.

Right/left portions of the bush guard 29 are connected respectively to the right/left vertical support portions 17 by bolts at two, namely upper and lower portions, and the bush guard 29 is thus attached and fixed to the right/left vertical support portions 17. The bush guard 29 can be removed by undoing the bolt connection.

As described above, the attachment portions T for the front bumper 25, the direction indicators 26, the work lamps 27, the under guard 28, and the bush guard 29, each of which serve as an auxiliary device H, are provided at different portions. Accordingly, all of the plurality of auxiliary devices H can be attached at the same time, or any one of the auxiliary devices H can also be attached, or any two or more of the auxiliary devices can also be attached at the same time.

Variations of First Embodiment (1) The above embodiment employs a configuration in which a plurality of auxiliary devices H (the front bumper 25, the direction indicators 26, the work lamps 27, the under guard 28, and the bush guard 29) can be attached at the same time. However, in place of this configuration, a configuration in which only one auxiliary device is attached, or a configuration in which two, three, or four auxiliary devices can be attached at the same time, may be employed. (2) In the above embodiment, the auxiliary devices are not limited to the front bumper 25, the direction indicators 26, the work lamps 27, the under guard 28, and the bush guard 29, and any other kinds of auxiliary devices may be used.

(3) The present invention is applicable to various work vehicles, such as a tractor and a combine harvester, as well as to the above-described multipurpose vehicle.

Second Embodiment

A carrier tray or a platform 104 according to the second embodiment and a work vehicle that includes the carrier tray 104 will be described below with reference to FIGS. 9 to 13.

Overall Configuration

Figure 9:
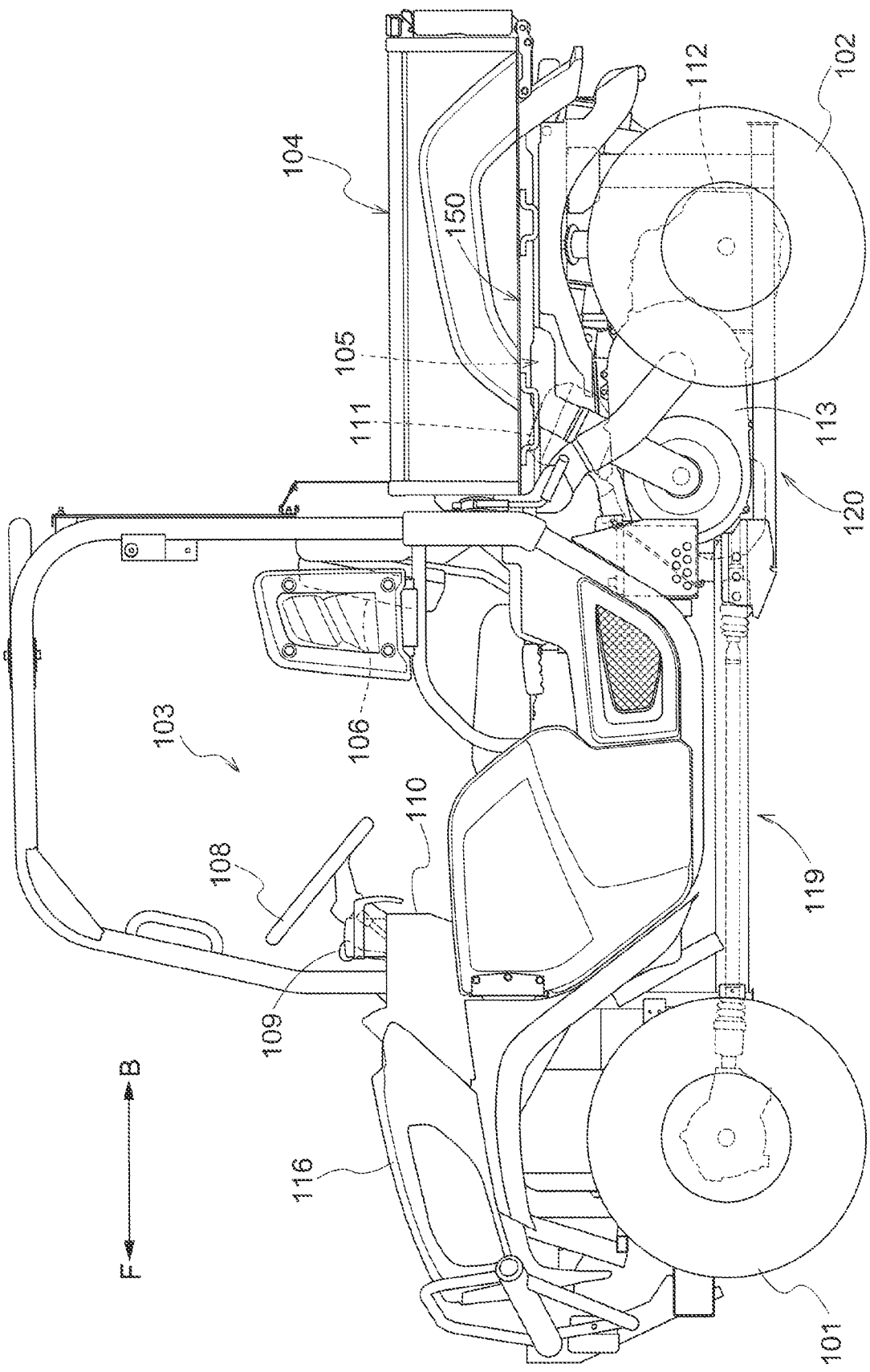
FIG. 9 is an overall side view of a work vehicle according to a second embodiment (the same applies to FIGS. 10 to 13)
Figure 10:
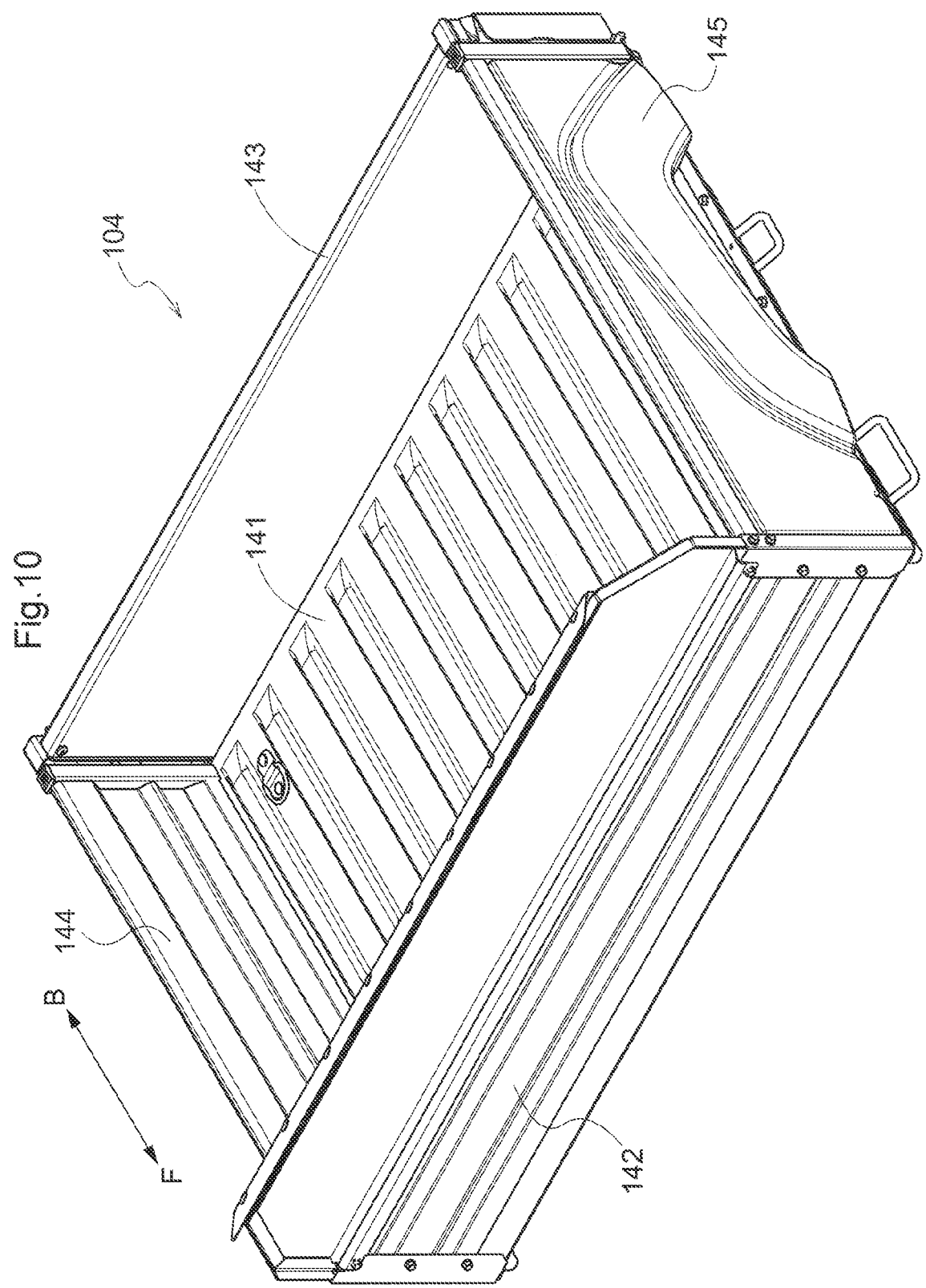
FIG. 10 is a perspective view of a carrier tray included in the work vehicle.

FIG. 9 is an overall side view of a work vehicle. FIG. 10 is a perspective view of the carrier tray 104 included in the work vehicle.

A multipurpose work vehicle, which is an example of the work vehicle shown in FIG. 9, is a work vehicle to be used for various purposes, such as transportation of goods and recreation, and is also called a utility vehicle. The multipurpose work vehicle includes a pair of right/left front wheels 101, which can be steered and driven, a pair of right/left rear wheels 102, which can be driven, a driving section 103, on which an operator or the like can sit, the carrier tray 104, on which goods can be loaded, a motive portion 105, which is located below the carrier tray 104, and so on.

The driving section 103 is provided with a driver seat 106, on which the operator sits, a steering wheel 108 for performing a steering operation, a gear shift lever 109 for performing a gear shift operation, and so on. The steering wheel 108 and the gear shift lever 109 are arranged in a driving panel 110, which is located in front of the driver seat 106.

The motive portion 105 is provided with a gasoline engine 111 (hereinafter referred to as "engine 111"), a transmission case 112, which is located rearward of the engine 111, a continuously variable transmission 113, which is located leftward of the engine 111 and the transmission case 112 and transmits motive power from the engine 111 to the transmission case 112, an air supply device (not shown) for supplying air for combustion to the engine 111, an air discharge device (not shown) for processing exhausted air from the engine 111, and so on.

The periphery of the continuously variable transmission 113 is covered by a case, and a belt-type continuously variable speed change mechanism (not shown) is mounted inside the case. The continuously variable transmission 113 is connected to and supported by the engine 111 and a lateral side portion of the transmission case 112. The transmission case 112 is connected to and supported by the rear side of the engine 111. A front portion of the traveling vehicle body is provided with a hood 116 that can be opened and closed, a radiator (not shown) for cooling the engine 111, and the like are arranged in a space formed inside the hood 116.

The traveling vehicle body of the work vehicle includes a main frame 119 for supporting the front portion and an intermediate portion of the vehicle body, and a rear frame 120 for supporting the motive portion 105. The rear frame 120 supports the right/left rear wheels 102 via rear suspensions (not shown), and the main frame 119 supports the right/left front wheels 101 via front suspensions (not shown).

Motive power from the engine 111 is subjected to continuous speed change by the continuously variable transmission 113, and is then transmitted to the transmission case 112. A gear-type speed change mechanism (not shown) provided in the transmission case 112 can realize forward travel states (a forward first-speed state and a forward second-speed state), a reverse state, and a neutral state. Motive power from the transmission case 112 is transmitted to the right/left front wheels 101 and the right/left rear wheels 102.

Carrier Tray

The carrier tray 104 is supported by the traveling vehicle body (the rear frame 120) of the work vehicle. FIG. 10 is a perspective view of the carrier tray 104 included in the work vehicle, as viewed from above. The carrier tray 104 includes a bottom plate 141, which has a goods loading surface on which goods are loaded, and a beam framework 150, which is located below the bottom plate 141 and has a plurality of members for taking on a load applied to the bottom plate 141. The carrier tray 104 is formed to have a box shape that has a rear plate, which rises from a rear end portion of the bottom plate 141, a front plate, which rises from a front end portion of the bottom plate 141, a right plate, which rises from a right end portion of the bottom plate 141, and a left plate, which rises from a left end portion of the bottom plate 141.

Beam Framework

Figure 11:
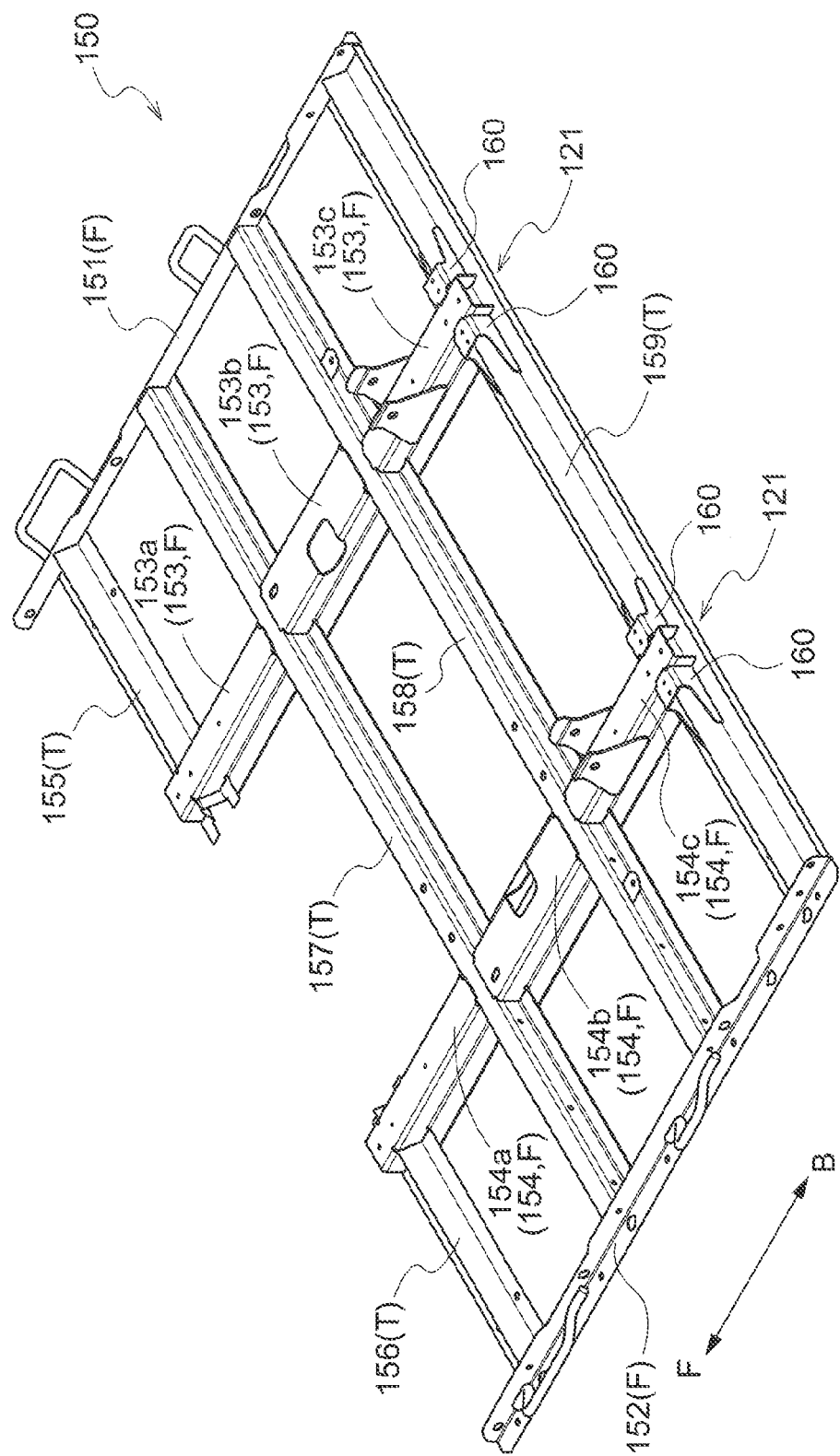

FIG. 11 is a perspective view of the beam framework 150 that the carrier tray 104 is provided with, as viewed from below. As shown in FIG. 11, the beam framework 150, which supports the carrier tray 104 from below, includes front-rear direction members F, which extend in the front-rear direction of the work vehicle, and lateral direction members T, which extend in the lateral direction of the work vehicle. The front-rear direction members F include an outer frame member 151 and an outer frame member 152, which constitute outer frames of the beam framework 150, and an intermediate member 153 and an intermediate member 154, which are provided on the inner side of the beam framework 150. In this embodiment, each of the outer frame member 151 and the outer frame member 152 is formed of a single member. The intermediate member 153 is configured by combining three members, namely a first intermediate member 153a, a second intermediate member 153b, and a third intermediate member 153c, with each other. The intermediate member 154 is configured by combining three members, namely a first intermediate member 154a, a second intermediate member 154b, and a third intermediate member 154c, with each other. The lateral direction members T include a fourth intermediate member 155, a fifth intermediate member 156, a sixth intermediate member 157, a seventh intermediate member 158, and an outer frame member 159. These members (the front-rear direction members F and the lateral direction members T) that constitute the beam framework 150 are joined to each other by means of welding or the like, and thus, a beam framework 150 with a robust structure is formed.

Intersecting Portion of Beam Framework

Figure 12:
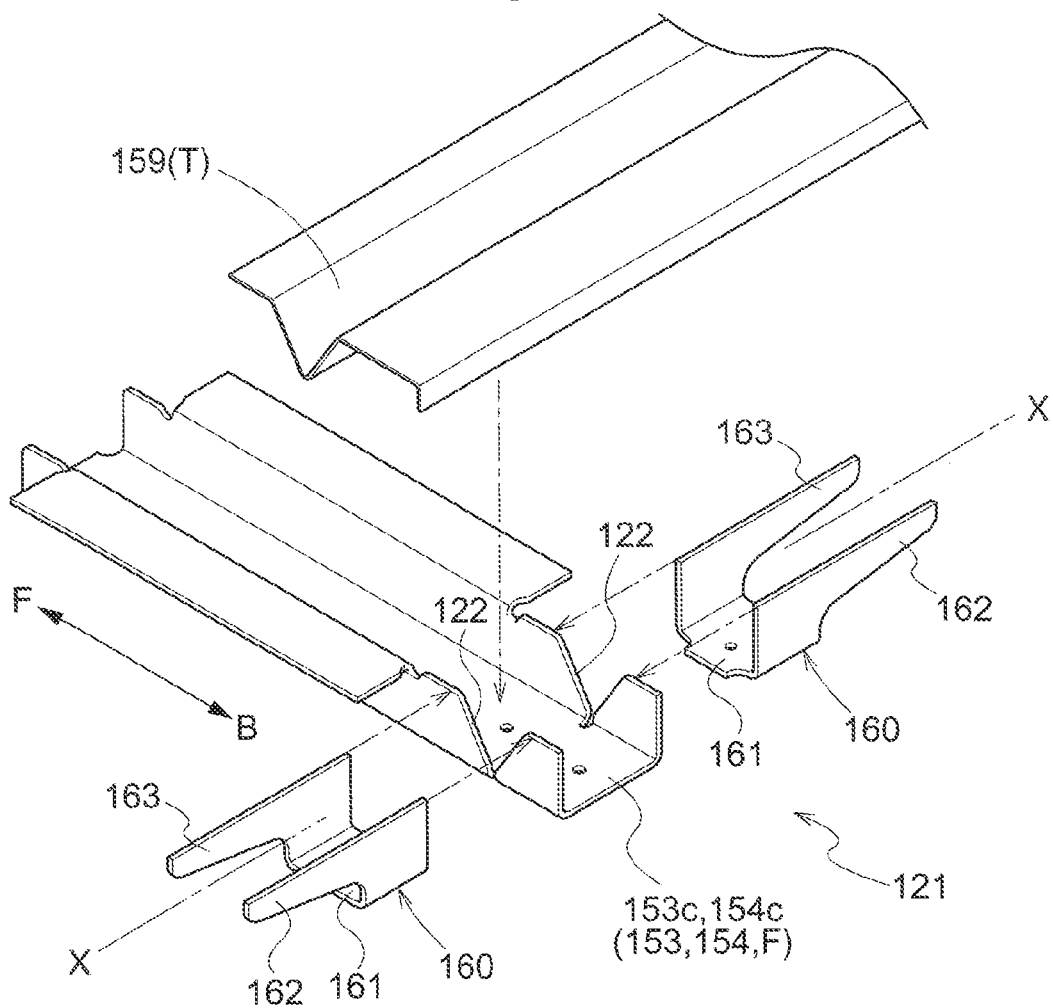
FIG. 12 is an exploded perspective view of an intersecting portion in the beam framework.
Figure 13:
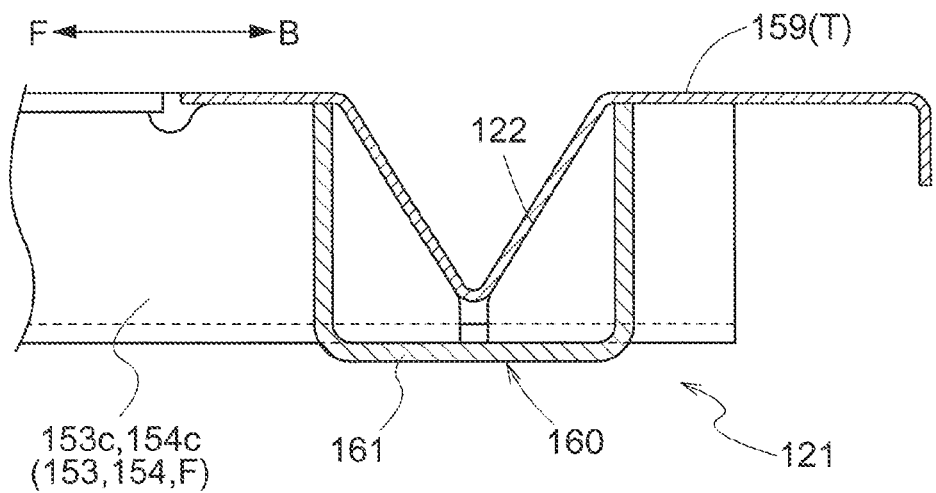
FIG. 13 is a vertical cross-sectional view of the intersecting portion.

FIG. 12 is an exploded perspective view of an intersecting portion 121 in the beam framework 150. FIG. 13 is a vertical cross-sectional view of the intersecting portion 121. Although FIG. 12 shows the structure of an intersecting portion 121 between the outer frame member 159 and the third intermediate member 153c, an intersecting portion 121 between the outer frame member 159 and the third intermediate member 154c also has the same structure. In this embodiment, intersecting portions 121 at each of which two members intersect each other are present in the beam framework 150. That is to say, the outer frame member 159, which serves as a lateral direction member T located on the rear end side of the beam framework 150, intersects the third intermediate member 153c, which serves as a front-rear direction member F, and intersects the third intermediate member 154c, which serves as a front-rear direction member F. At the intersecting portions 121, the outer frame member 159 is located above the third intermediate member 153c and the third intermediate member 154c. That is to say, the third intermediate member 153c and the third intermediate member 154c support the outer frame member 159 from below. Each of the intersecting portions 121 is provided with fixing members 160.

A structure of the intersecting portion 121 will be described below.

As shown in the diagrams, in the beam framework 150, the outer frame member 159, which serves as an upper beam member that is located on the upper side at the intersecting portion 121, and the third intermediate member 153c, which serves as a lower beam member that is located on the lower side, are fitted to each other at the portion of a fitting groove 122, which is provided in the third intermediate member 153c. In addition, the fixing members 160 are fixed to both the outer frame member 159 serving as the upper beam member and the third intermediate member 153c serving as the lower beam member at the intersecting portion 121. For example, the fixing members 160 are joined to the outer frame member 159 at portions at which the fixing members 160 come into contact with the outer frame member 159, by means of welding or the like, and are joined to the third intermediate member 153c at portions at which the fixing members 160 come into contact with the third intermediate member 153c, by means of welding or the like.

Fixing Member at Intersecting Portion

Thus, the outer frame member 159 (upper beam member) and each of the third intermediate members 153c and 154c (lower beam members) are fixed, not only at the portion of the fitting groove 122, but also via the fixing members 160. As a result, stress is also applied to the portions of the outer frame member 159 and each of the third intermediate members 153c and 154c that come into contact with the fixing members 160, and therefore, stress does not concentrate at an area around the portion of the fitting groove 122 at which the outer frame member 159 and each of the third intermediate members 153c and 154c are directly fixed to each other.

Each of the fixing members 160 has a semi-tubular portion 161, which has a shape of a vertically-divided tube, such that the axial direction of the tube extends in the direction (left-right direction) in which the outer frame member 159 serving as the outer beam member extends, and such that the semi-tubular portion 161 covers a side face of the outer frame member 159. In other words, the semi-tubular portion 161 of each fixing member 160 has an arch shape that crosses and straddles the outer frame member 159. Also, the semi-tubular portion 161 of each fixing member 160 according to this embodiment has a rectangular lateral cross section. Thus, the semi-tubular portion 161 that has a shape with a robust structure is fixed to the outer frame member 159 so as to cover the side faces of the outer frame member 159 (upper beam member), and is also fixed to each of the third intermediate members 153c and 154c (lower beam members). That is to say, the outer frame member 159 and each of the third intermediate members 153c and 154c can be fixed to each other via the fixing members 160 that have a robust structure.

Furthermore, each of the fixing members 160 according to this embodiment has the aforementioned semi-tubular portion 161, and extending portions 162 and 163, which have a flat plate-like shape and extend from the semi-tubular portion 161 toward the side away from the intersecting portion 121 in the direction in which the outer frame member 159 serving as the upper beam member extends. The width of the extending portions 162 and 163 in the vertical direction decreases as they extend away from the intersecting portion 121, i.e. the extending portions 162 and 163 have a tapered shape that narrows as they extend away from the intersecting portion 121. That is to say, the extending portions 162 and 163 that constitute each fixing member 160 are narrower, i.e. are structurally weaker as they extend away from the intersecting portion 121. As a result, a strong force is not applied to portions of the outer frame member 159 (upper beam member) that are fixed to the extending portions 162 and 163, the portions being distant from the intersecting portion 121, due to the extending portions 162 and 163.

Variations of Second Embodiment (1) The above embodiment has described the carrier tray 104 according to the present invention and the work vehicle that includes the carrier tray 104 while using a specific example, but the configuration of the carrier tray 104 and the work vehicle may be modified as appropriate.

For example, the shape and the like of the members that constitute the beam framework 150 may be modified as appropriate. As an example, the above embodiment has described an example in which the lateral cross section of the outer frame member 159 serving as the upper beam member has a triangular shape, but the shape may alternatively be a circular (semi-circular) shape or a polygonal shape. Similarly, the shape of the third intermediate members 153c and 154c serving as the lower beam members is not limited to the shape described in the above embodiment either.

In addition, the above embodiment has described an example in which the lateral cross section of the semi-tubular portion 161 of each fixing member 160 is formed to have a rectangular shape, but the lateral cross section of the semi-tubular portion 161 may alternatively be formed into a semi-circular shape or a polygonal shape.

(2) The above embodiment has described an example in which, at the intersecting portion 121, the outer frame member 159 serving as the upper beam member and each of the third intermediate members 153c and 154c serving as the lower beam members are fitted to each other at the portion of the fitting groove 122 that is provided in each of the third intermediate members 153c and 154c. However, a configuration in which the fitting groove 122 is formed in the upper beam member, or a configuration in which fitting grooves 122 are formed in both the upper beam member and the lower beam member, may alternatively be employed.

(3) The above embodiment has described an example in which each fixing member 160 includes the semi-tubular portion 161, but each fixing member 160 does not need to include the semi-tubular portion 161, and may alternatively be constituted only by one or more plate-shaped members that come into contact with both the upper beam member and the lower beam member and are fixed thereto, for example.

(4) Although the above embodiment has described a multi-purpose work vehicle (utility vehicle) as an example of a work vehicle, the present invention is applicable not only to a multipurpose work vehicle but also to various types of work vehicles that include the carrier tray 104.

(5) The configuration disclosed in the above embodiment (including variations; the same applies to the following description) may be applied by being combined with a configuration disclosed in other embodiments provided there is no inconsistency. Also, the embodiments disclosed in the present specification are examples, and the embodiment of the present invention is not limited thereto and may be modified as appropriate without departing from the purpose of the present invention.

Third Embodiment

The third embodiment will be described below.

In the following description, the direction denoted by an arrow F in FIG. 14 indicates the front side, the direction denoted by an arrow B indicates the rear side, the direction denoted by an arrow L indicates the left side, the direction denoted by an arrow R indicates the right side, the direction denoted by an arrow U indicates the upper side, and the direction denoted by an arrow D indicates the lower side.
Overall Configuration A multipurpose vehicle (an example of a work vehicle), the entirety of which is shown in FIG. 14, is a vehicle that can be used for various purposes, such as transportation of goods and recreation, and is also called a utility vehicle.

Figure 14:
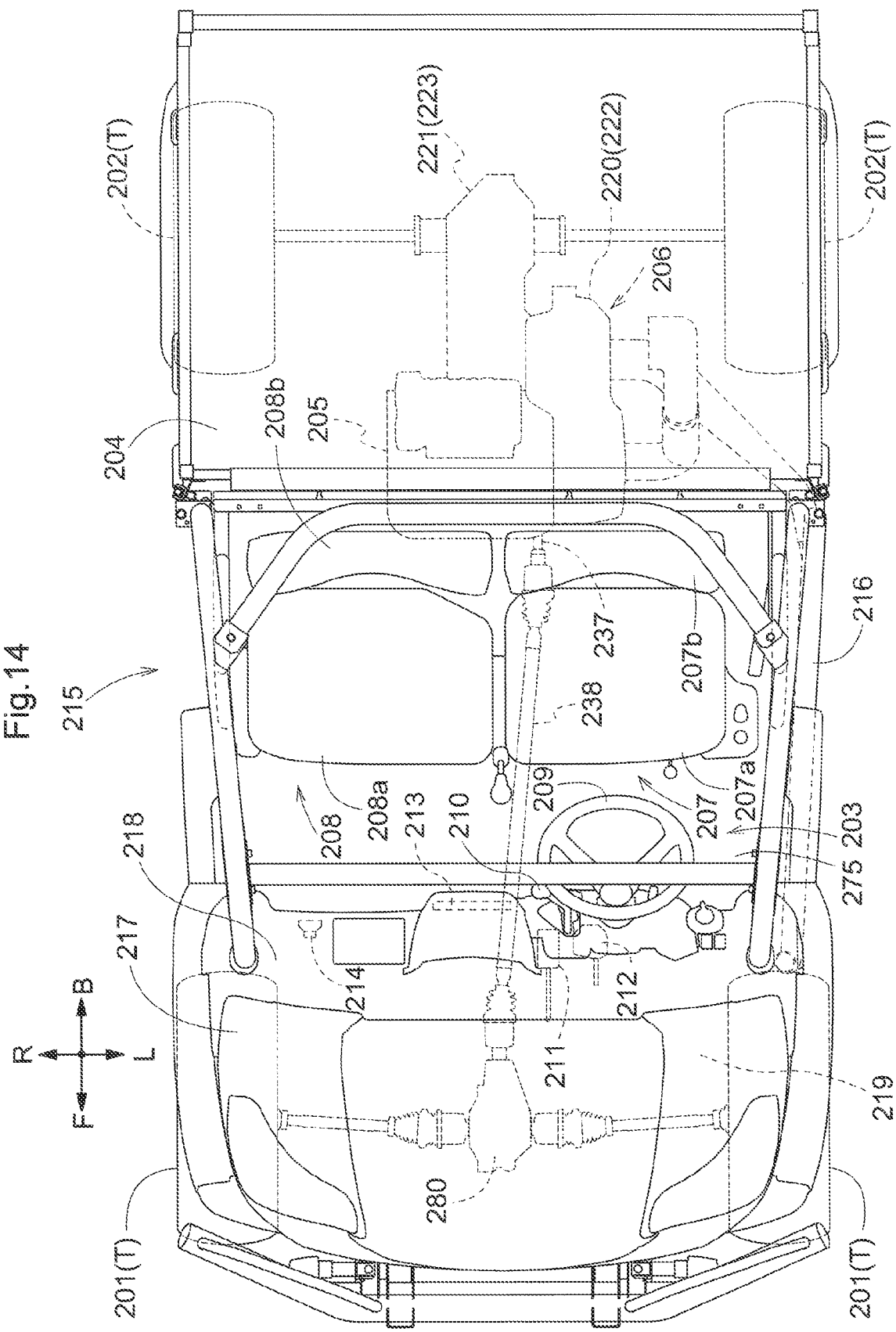
FIG. 14 is a top view of an overall multipurpose vehicle according to a third embodiment (the same applies to FIGS. 15 to 26)

As shown in FIG. 14, the multipurpose vehicle is provided with a traveling machine body capable of self-traveling using a traveling apparatus T, which is constituted by a pair of right/left front wheels 201 that can be steered and driven, and a pair of right/left rear wheels 202 that can be driven. A driving section 203, in which occupants sit, is provided in the center portion, in the front-rear direction, of the traveling machine body. A carrier tray 204, onto which goods can be loaded and which can dump goods in a rearward inclined orientation to discharge the goods, is provided behind the driving section 203 in the traveling machine body. The carrier tray 204 is supported so as to be able to perform a pivot ascending/descending operation between a loading state where the carrier tray 204 is oriented parallel to the front-rear direction of the traveling machine body and a dumping state where the carrier tray 204 is inclined with the front end side thereof positioned upward and the rear side thereof positioned downward, around a pivot fulcrum, which is a vehicle-body lateral axis of a spindle provided at a rear end portion of the carrier tray 204. The ascending/descending operation of the carrier tray 204 is manually performed utilizing an action of a gas spring (not shown), or is performed by operating an electric hydraulic actuator (not shown), for example. A gasoline engine (hereinafter referred to simple as "engine 205"), which serves as a motive power source, and a transmission 206, which can change the speed of motive power from the engine 205, are provided below the carrier tray 204 in the traveling machine body.

Figure 15:
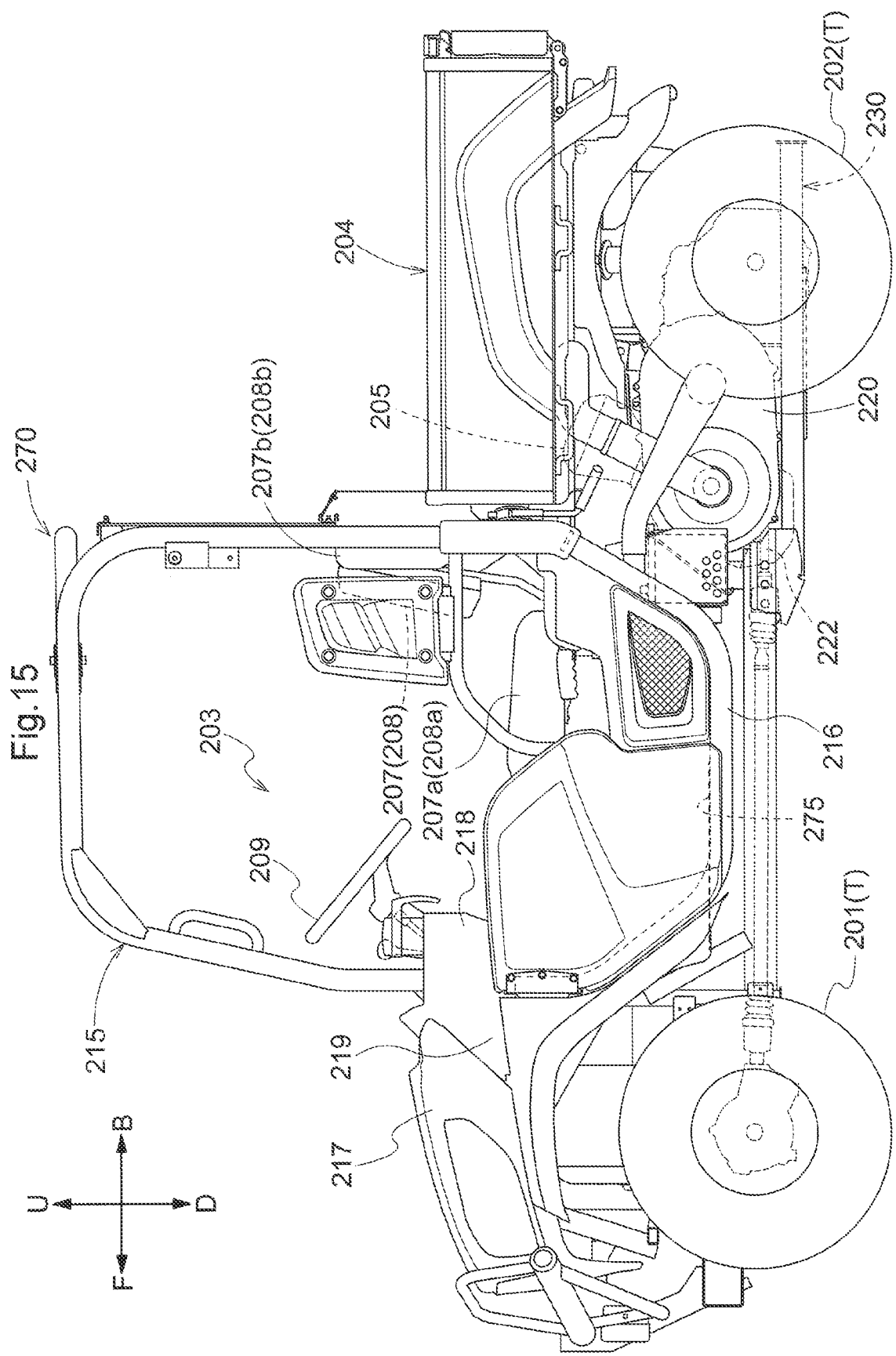
FIG. 15 is a left side view illustrating the overall multipurpose vehicle.

As shown in FIGS. 14 and 15, the driving section 203 is provided with a driver seat 207, on which an operator can sit, an auxiliary seat 208, on which a passenger can sit, a steering wheel 209 for performing a steering operation, a gear shift lever 210 for performing a gear shift operation, an acceleration pedal 211, which is an operation input tool for giving an instruction of a target number of revolutions of the engine 205 to change the vehicle speed, a brake pedal 212, which enables a braking operation, a meter panel 213, which serves as a display capable of displaying various kinds of information, a buzzer device 214, which serves as a sound generator for generating sound, and so on.

Various tanks for battery liquid and the like and various devices are arranged on the front side, in the front-rear direction, of the traveling machine body, and a hood 217 is provided so as to cover these tanks and devices. A space below the hood 217 and a space below a cover 218 are integrated to form a front wheel-side space 219. For example, a front wheel driving mechanism 280 for transmitting motive power output from a gear-type speed change mechanism 221 to the right/left front wheels 201 is arranged, as an example of the aforementioned various tanks and devices, in the front wheel-side space 219.

Figure 16:
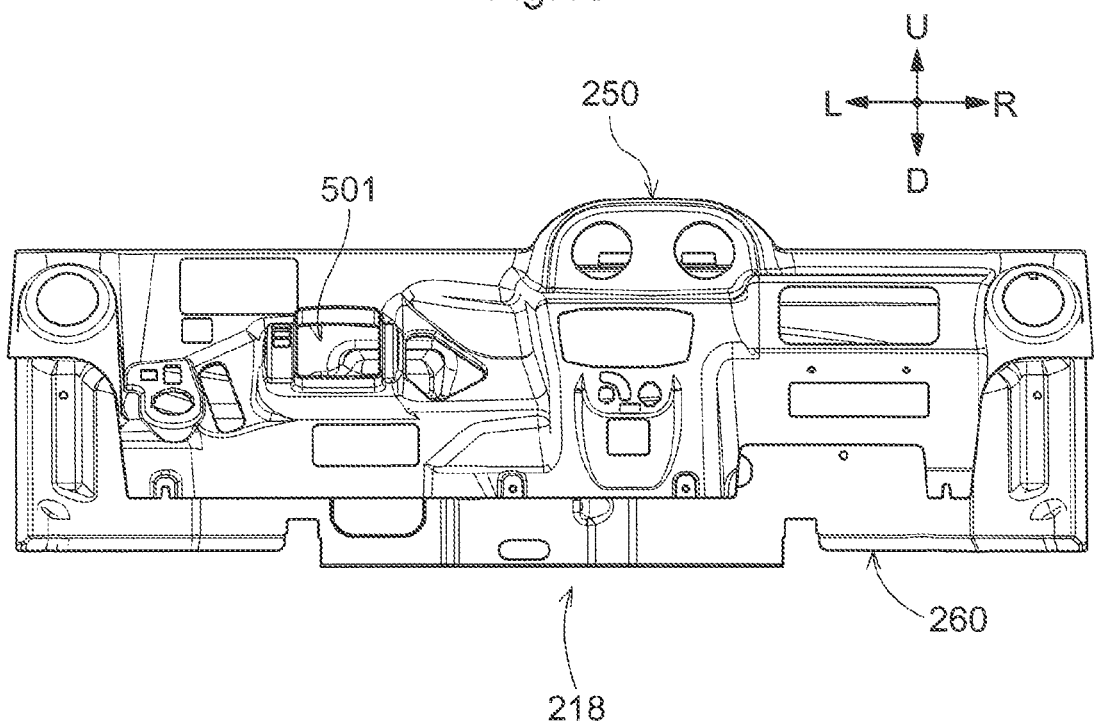
FIG. 16 is a front elevational view of a cover as viewed from a driving section side.
Figure 17:
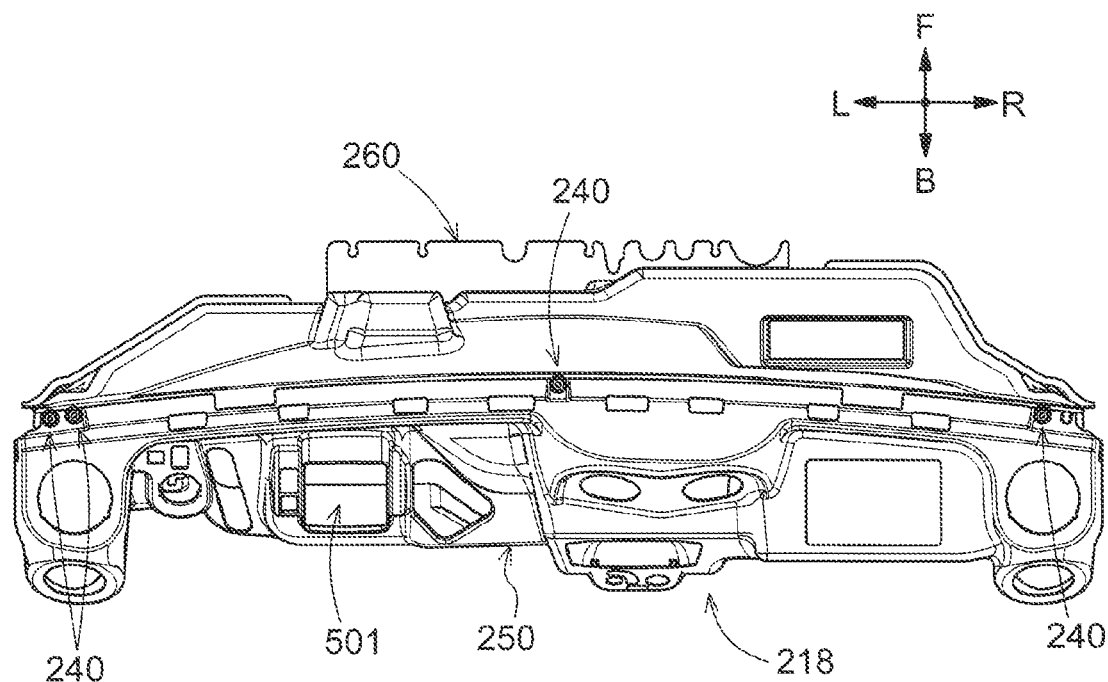
FIG. 17 is a top view of the cover.
Figure 18:
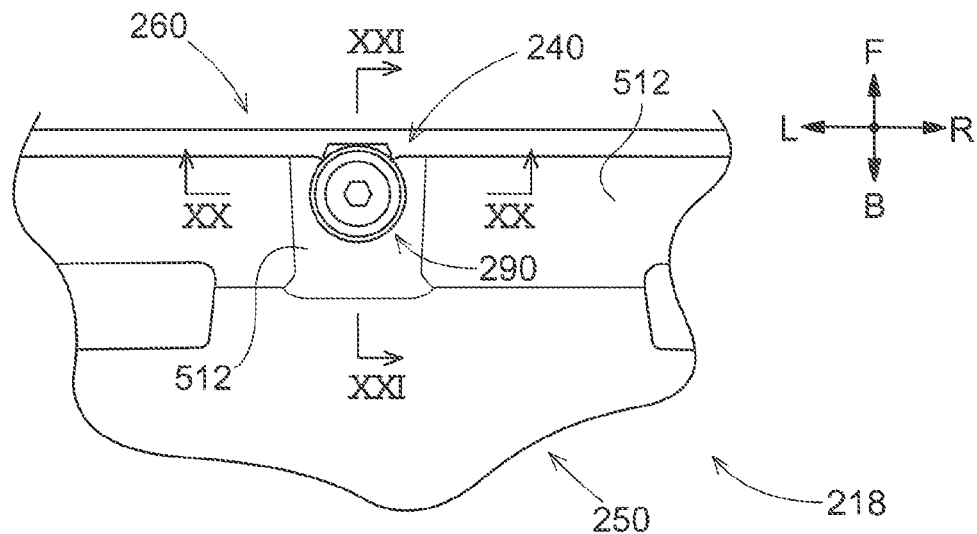
FIG. 18 is an enlarged top view of a fastening mechanism for fastening a front panel and a front wheel-side panel.

The traveling machine body is provided with the cover 218, which divides the driving section 203 from the front wheel-side space 219. In this embodiment, the cover 218 includes a front panel 250 and a front wheel-side panel 260, as shown in FIGS. 16 to 18. The front panel 250 and the front wheel-side panel 260 are molded by blow-molding a plate-shaped member, for example. As shown in FIG. 16, a plurality of openings are formed in the front panel 250. For example, a shaft portion of the steering wheel 209 is inserted into an opening 501, and a base portion of the gear shift lever 210 or the like is inserted into another opening. Thus, the steering wheel 209, the gear shift lever 210, and so on, are arranged so as to project from the front face of the front panel 250 toward the driving section 203 side.

As shown in FIGS. 14 to 17, the front wheel-side panel 260 is located forward of the front panel 250. The front wheel-side panel 260 is a panel that extends in the vertical direction, and is arranged to face the front wheel-side space 219. Meanwhile, the front panel 250 is arranged corresponding to a sitting space where the driving section 203 is arranged. The front panel 250 and the front wheel-side panel 260 are fastened to each other by a later-described fastening mechanism 240.

The driver seat 207 and the auxiliary seat 208 are attached onto a floor step 275, which serves as a footing for the operator and the like. The driver seat 207 includes a seat portion 207a and a backrest portion 207b. Similarly, the auxiliary seat 208 includes a seat portion 208a and a backrest portion 208b.

The multipurpose vehicle also includes a vehicle body frame 270, which is configured by combining frame bodies. The vehicle body frame 270 is formed with support members that have a hollow pipe-like shape and are made of iron, an iron alloy, or the like, for example, as well as members that serve as a framework or the like and are not readily deformed. As shown in FIGS. 14 and 15, the vehicle body frame 270 includes a support section 230 for supporting the traveling apparatus T, the driving section 203, the carrier tray 204, the engine 205, the transmission 206, and so on, and an upper protection frame 215 and a lower protection frame 216 that surround a sitting space in the driving section 203 in which occupants sit. The support portion 230, the upper protection frame 215, and the lower protection frame 216 are joined by a joint member to constitute the vehicle body frame 270.

As shown in FIGS. 14 to 16, the transmission 206 includes a continuously variable speed change mechanism 220 of a continuously variable type, the gear-type speed change mechanism 221 of a gear shift type, and the like. The continuously variable speed change mechanism 220 is configured to continuously change the speed of motive power from the engine 205 and transmit the motive power to the traveling apparatus T. The gear-type speed change mechanism 221 can change, stepwise, the speed of motive power input from a transmission output shaft (not shown) of the continuously variable speed change mechanism 220, and output the motive power to the traveling apparatus T. Accordingly, motive power of the engine 205 is subjected to predetermined speed change by the continuously variable speed change mechanism 220 and is then further subjected to predetermined speed change by the gear-type speed change mechanism 221, and is thereafter transmitted to the traveling apparatus T. The continuously variable speed change mechanism 220 is accommodated in a transmission case 222, which is located on a lateral side of the engine 205. The gear-type speed change mechanism 221 is accommodated in a transmission case 223, which is located rearward of the engine 205. In this embodiment, the continuously variable speed change mechanism 220 is arranged leftward of the engine 205.

As shown in FIG. 14, motive power output from the gear-type speed change mechanism 221 is transmitted to the right/left rear wheels 202. Also, motive power output from the gear-type speed change mechanism 221 is transmitted to the front wheel driving mechanism 280 via a power takeoff shaft 237, which extends forward, and a propeller shaft 238, which extends in the front-rear direction. The right/left front wheels 201 are driven by the motive power transmitted from the front wheel driving mechanism 280.

Fastening Mechanisms for Cover

Next, fastening mechanisms 240 for the cover 218 will be described with reference to FIGS. 17 to 26.

As mentioned above, the cover 218 is configured by connecting the front panel 250 and the front wheel-side panel 260 to each other. The fastening mechanisms 240 for connecting the front panel 250 and the front wheel-side panel 260 to each other are provided at four portions of the cover 218, the four portions being arranged in the left-right direction as shown in FIG. 17 and other diagrams, for example. The four fastening mechanisms 240 include, for example, one fastening mechanism 240 that is arranged at a center portion, one fastening mechanism 240 that is arranged at the right end, and two fastening mechanisms 240 that are arranged at the left end, in the left-right direction of the cover 218. Each of these fastening mechanisms 240 includes a first fastening portion 512, which is provided at a later-described first edge portion 510, a second fastening portion 612, which is provided at a second edge portion 610, and a fastening member 290. Since the aforementioned four fastening mechanisms 240 have the same shape, the configuration of the fastening mechanism 240 at the center portion will be described below.

Figure 19:
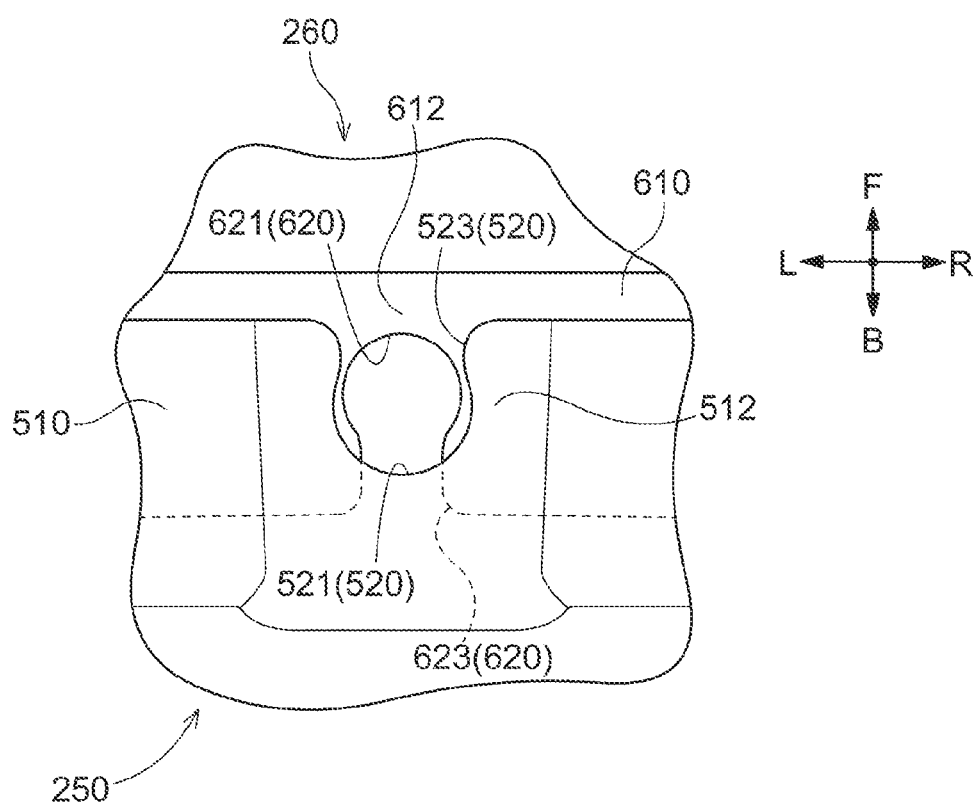
FIG. 19 is a top view illustrating an arrangement relationship between a first fastening portion of the front panel and a second fastening portion of the front wheel-side panel.

As shown in FIG. 18, when the cover 218 is seen from above, the later-described first edge portion 510 of the front panel 250 is arranged on the upper side, the later-described second edge portion 610 of the front wheel-side panel 260 is arranged on the lower side, and the front panel 250 and the front wheel-side panel 260 are connected to each other by the fastening member 290. FIG. 19 shows an arrangement relationship between the front panel 250 and the front wheel-side panel 260 when they are connected to each other, while omitting the fastening member 290 from the enlarged top view in FIG. 18. As shown in FIG. 19, the front panel 250 has the first edge portion 510, which is formed with a plate-shaped member, at an end portion that extends in the left-right direction and opposes the front wheel-side panel 260. Similarly, the front wheel-side panel 260 has the second edge portion 610, which is formed with a plate-shaped member, at an end portion that extends in the left-right direction and opposes the front panel 250. The first edge portion 510 and the second edge portion 610 are formed into shapes that correspond to each other such that they can come into contact with each other at least partially.

Figure 20:
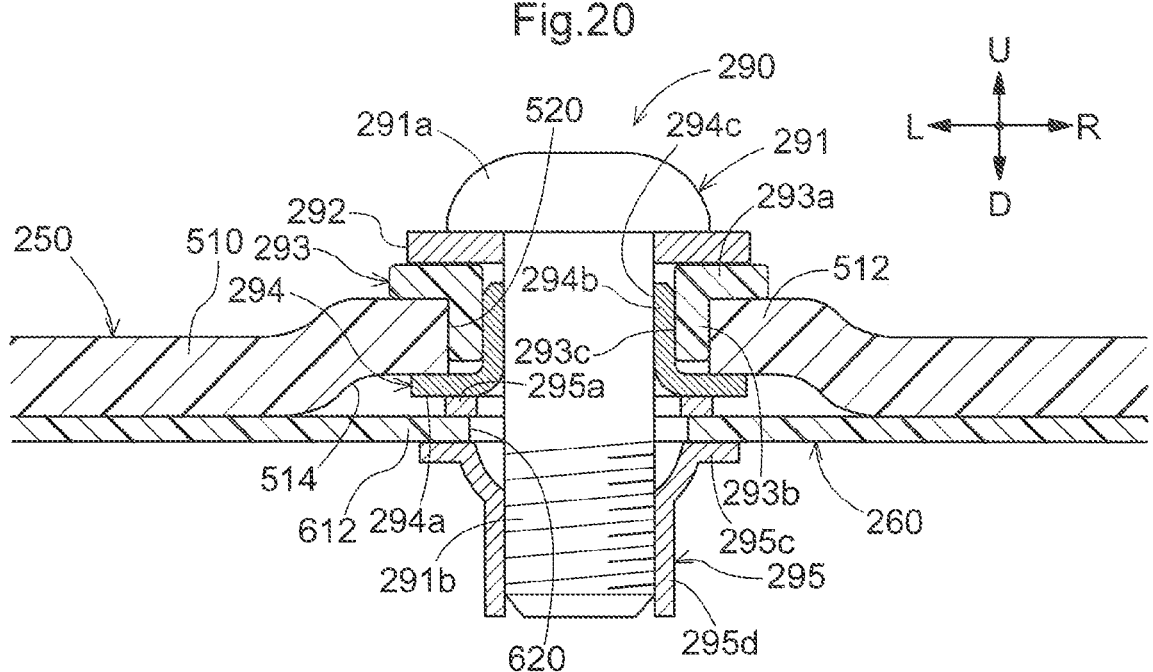
FIG. 20 is a cross-sectional view taken along a line XX-XX in FIG. 18.
Figure 21:
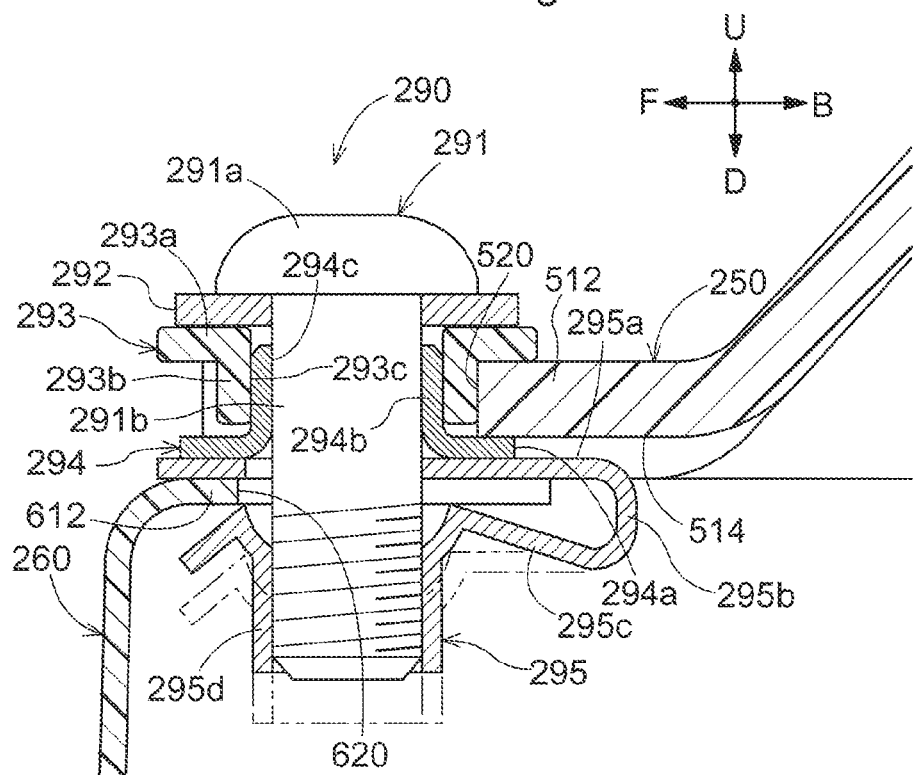
FIG. 21 is a cross-sectional view taken along a line XXI-XXI in FIG. 18.

The first edge portion 510 has the first fastening portion 512, which is held from two opposite sides by the fastening member 290 as shown in FIGS. 20 and 21 and other diagrams, which will be described later, with the first edge portion 510 of the front panel 250 and the second edge portion 610 of the front wheel-side panel 260 opposing each other. Meanwhile, the second edge portion 610 has the second fastening portion 612, which is held from two opposite sides by the fastening member 290 as shown in FIGS. 20 and 21 and other diagrams, which will be described later, with the first edge portion 510 and the second edge portion 610 opposing each other. The second fastening portion 612 is a portion of the second edge portion 610 that corresponds to the first fastening portion 512. As shown in FIG. 19, a first open hole 520 is formed in the first fastening portion 512, and a second open hole 620 is formed in the second fastening portion 612. A shaft portion 291b of a later-described bolt 291, which is a portion of the fastening member 290, is inserted into the first open hole 520 and the second open hole 620 in the thickness direction of these open holes.

As shown in FIGS. 20 and 21, the front panel 250 and the front wheel-side panel 260 are fastened to each other as a result of the fastening member 290 holding the first fastening portion 512 and the second fastening portion 612 from two opposite sides, with a portion (the shaft portion 291b) of the fastening member 290 inserted into the first open hole 520 in the first fastening portion 512 and the second open hole 620 in the second fastening portion 612.

A further description will be given in detail, with reference to FIGS. 18 to 26 and other diagrams, of the configuration of the first fastening portion 512 and the second fastening portion 612 in relation to the fastening mechanism 240 for the front panel 250 and the front wheel-side panel 260.

Figure 22:
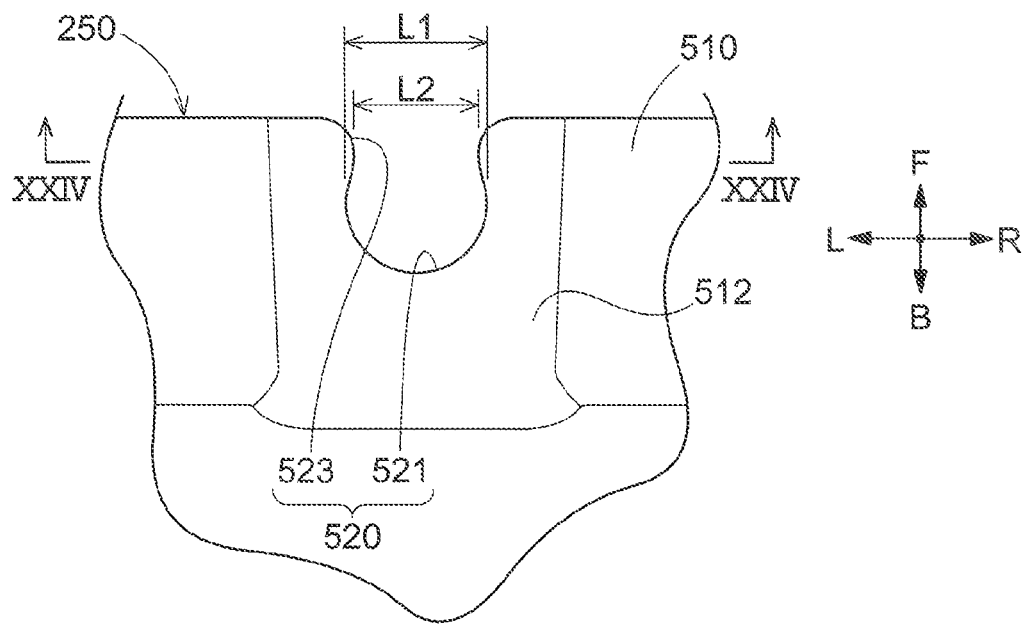
FIG. 22 is a top view of the first fastening portion of the front panel.
Figure 23:
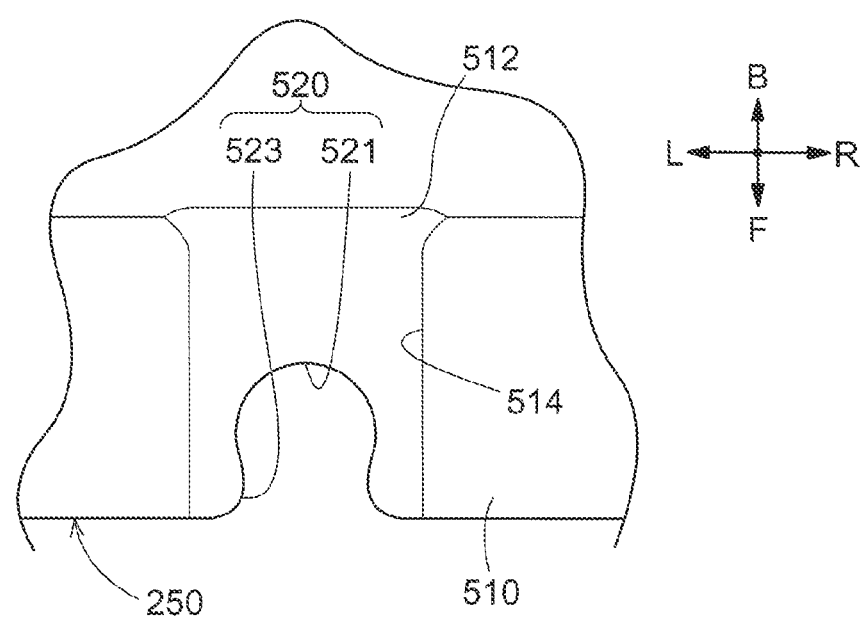
FIG. 23 is a bottom view of the first fastening portion of the front panel as viewed from below.
Figure 24:
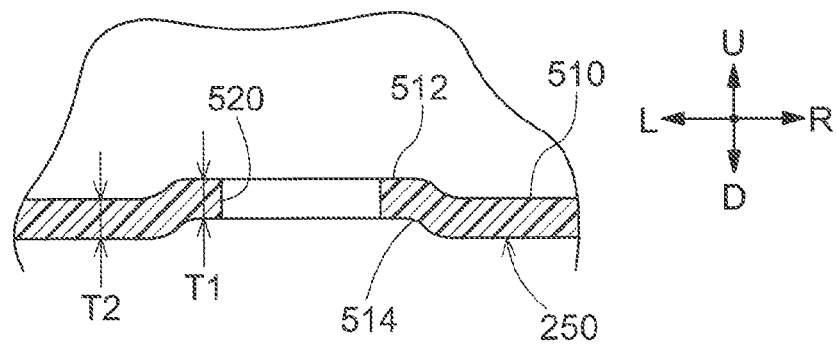
FIG. 24 is a side view of the first fastening portion of the front panel.

FIG. 22 is a top view of the first fastening portion 512 as viewed from above, FIG. 23 is a bottom view of the first fastening portion 512 as viewed from below, and FIG. 24 is a side view of the first fastening portion 512 as viewed from the side. As shown in FIGS. 22 to 24, the first fastening portion 512 is formed to bulge toward the side opposite to the face thereof opposing the second fastening portion 612, i.e. upward, so as to form a gap 514 (FIGS. 23 and 24) between the first fastening portion 512 and the second fastening portion 612. Thus, the first fastening portion 512 is formed to have a flat face that protrudes upward. In this case, as shown in FIG. 24, the thickness T1 of the first fastening portion 512, which is formed to bulge upward, is greater than or equal to the thickness T2 of the first edge portion 510, which is at the periphery of the first fastening portion 512. A bush flat face portion 294a of a later-described first bush 294 (interposed member) is fitted into the gap 514.

As shown in FIGS. 22 and 23 and other diagrams, the first open hole 520 in the first fastening portion 512 is formed to have a first circular portion 521 and a first communicating portion 523. The first circular portion 521 is a portion into which the later-described shaft portion 291b, which is a portion of the fastening member 290, is inserted, and is formed to have a circular shape as viewed in a plan view parallel to the first edge portion 510. The first communicating portion 523 has a width L2 that is smaller than the diameter L1 of the first circular portion 521 as viewed in the same plan view, and is continuous with the first circular portion 521 and open to an end face of the first edge portion 510.

Figure 25:
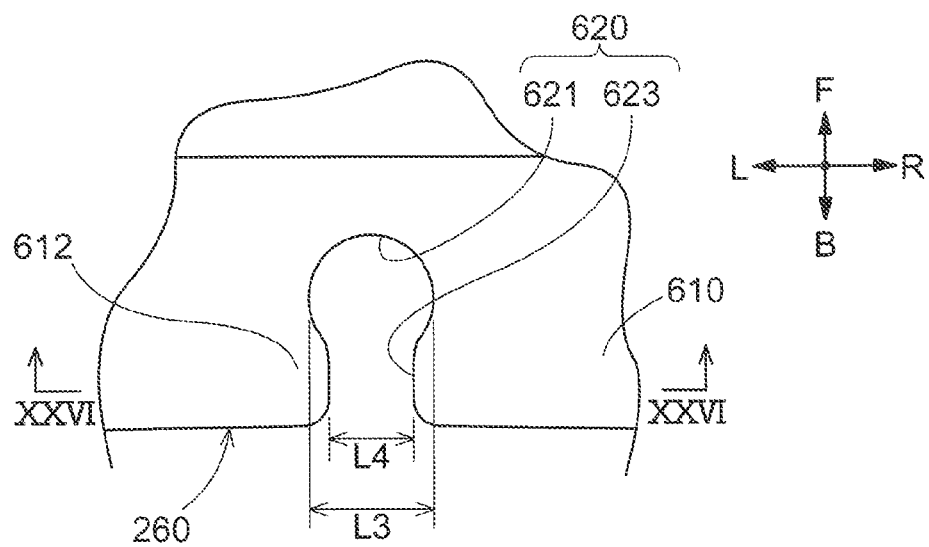
FIG. 25 is a top view of the second fastening portion of the front wheel-side panel.
Figure 26:
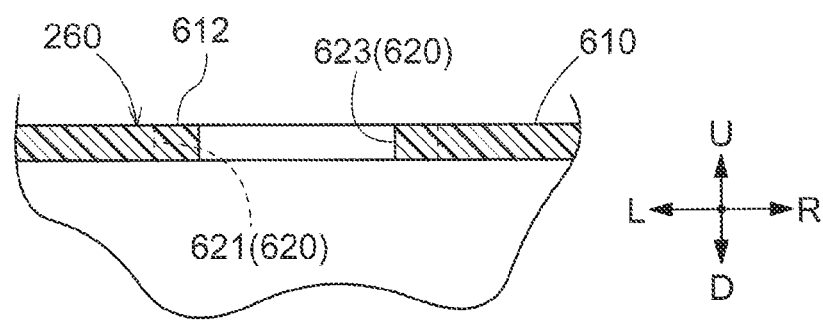
FIG. 26 is a cross-sectional view taken along a line XXVI-XXVI in FIG. 25.

FIG. 25 is a top view of the second fastening portion 612 as viewed from above, and FIG. 26 is a side view of the second fastening portion 612 as viewed from the side. As shown in FIGS. 25 and 26, the second fastening portion 612 is formed into a flat plate-like shape by extending the second edge portion 610, unlike the first fastening portion 512. Thus, the thicknesses of the second fastening portion 612 and the second edge portion 610 are substantially the same.

The second open hole 620 in the second fastening portion 612 is formed to have a second circular portion 621 and a second communicating portion 623. The second circular portion 621 is a portion into which the later-described shaft portion 291b is inserted, and is formed into a circular shape as viewed in a plan view parallel to the second edge portion 610. The second communicating portion 623 has a width L4 that is smaller than the diameter L3 of the second circular portion 621 as viewed in the same plan view, and is continuous with the second circular portion 621 and open to an end face of the second edge portion 610.

The first fastening portion 512 and the second fastening portion 612 are arranged along each other's plate-shaped faces as shown in FIG. 19, and are arranged such that the first open hole 520 and the second open hole 620 oppose each other. Furthermore, it is preferable that the first fastening portion 512 and the second fastening portion 612 are positioned such that the opening of the first communicating portion 523 of the first fastening portion 512 opposes the second circular portion 621 of the second fastening portion 612, and the opening of the second communicating portion 623 of the second fastening portion 612 opposes the first circular portion 521 of the first fastening portion 512. The fastening portion 290 is inserted into the first circular portion 521 and the second circular portion 621 in a state where they are arranged in this manner. In this case, even if the shaft portion 291b of the later-described bolt 291 moves to withdraw from the first circular portion 521 toward the opening of the first communicating portion 523, the shaft portion 291b is prevented from withdrawing by an inner wall of the second circular portion 621. Similarly, even if the shaft portion 291b moves to withdraw from the second circular portion 621 toward the opening of the second communicating portion 623, the shaft portion 291b is prevented from withdrawing by an inner wall of the first circular portion 521.

A configuration in which the aforementioned first fastening portion 512 and second fastening portion 612 are fastened to each other by the fastening member 290 will be described with reference to FIGS. 20 and 21. The fastening member 290 includes the bolt 291, a second bush 292, an elastic member 293 (interposed member), the first bush 294 (interposed member, bush), and a nut 295. The second bush 292, the elastic member 293, and the first bush 294 are interposed members for, for example, assisting the fastening when the first fastening portion 512 and the second fastening portion 612 are fastened to each other by the bolt 291 and the nut 295.

The bolt 291 has the shaft portion 291b, which penetrates the first open hole 520 and the second open hole 620, and a head portion 291a, whose diameter is greater than those of the first open hole 520 and the second open hole 620. In this embodiment, the bolt 291 penetrates from the first fastening portion 512 side toward the second fastening portion 612 side, and the head portion 291a protrudes while being locked to an upper face of the first fastening portion 512. The shaft portion 291b penetrates the first open hole 520 and the second open hole 620 and protrudes from the lower face of a second fastening portion 612.

The nut 295 is fitted onto the shaft portion 291b from the side opposite to the head portion 291a of the bolt 291, and the nut 295 and the head portion 291a of the bolt 291 hold the first fastening portion 512 and the second fastening portion 612 from two opposite sides. In this case, at least a portion of the nut 295 is located on a lower face of the second fastening portion 612, and the nut 295 is configured to lock the shaft portion 291b as a result of the shaft portion 291b being fitted thereto. For example, an outer-circumferential face of the shaft portion 291b is screw cut, and an inner-circumferential face of the nut 295 is screw cut so as to be able to be threaded onto the shaft portion 291b.

Although the configuration of the nut 295 is not limited to the following configuration, the configuration of the nut 295 employed in this embodiment will be further described with reference to FIGS. 20 and 21.

The nut 295 includes an upper flat face portion 295a, a lower flat face portion 295c, a connecting portion 295b for connecting the upper flat face portion 295a to the lower flat face portion 295c, and an engaging portion 295d with which the shaft portion 291b of the bolt 291 engages.

The upper flat face portion 295a is a plate-shaped member and has an open hole into which the shaft portion 291b of the bolt 291 is inserted. Similarly, the lower flat face portion 295c is a plate-shaped member and has an open hole into which the shaft portion 291b of the bolt 291 is inserted. The connecting portion 295b connects the upper flat face portion 295a to the lower flat face portion 295c so as to form a gap into which at least the second fastening portion 612 can be inserted, between a plate-shaped face of the upper flat face portion 295a and a plate-shaped face of the lower flat face portion 295c. Also, the connecting portion 295b connects the upper flat face portion 295a to the lower flat face portion 295c at a rear end portion excluding the gap into which the second fastening portion 612 is inserted.

The upper flat face portion 295a supports, with the plate-shaped face thereof, a lower face of the bush flat face portion 294a of the later-described first bush 294, as a result of the bolt 291 being threaded into the engaging portion 295d. As a result of the bolt 291 being threaded onto the engaging portion 295d, the lower flat face portion 295c deforms upward due to the elasticity of the upper flat face portion 295a, the connecting portion 295b, the lower flat face portion 295c itself, and the like, and at least a portion of the plate-shaped face of the lower flat face portion 295c supports the lower face of the second fastening portion 612 as shown in FIG. 21.

The engaging portion 295d is a cylindrical member, and the inner-circumferential face thereof is screw cut, such that the shaft portion 291b whose outer-circumferential face is screw cut can be threaded therewith.

The elastic member 293 is not particularly limited as long as it is a member that has elasticity, but may be a resin, such as rubber, for example. The elastic member 293 has an elastic vertical portion 293b, which forms an elastic open hole 293c into which the shaft portion 291b is inserted, and an elastic flat face portion 293a, which extends radially outward from the elastic vertical portion 293b. The elastic vertical portion 293b has a cylindrical shape and is fitted to an inner-circumferential face of the first open hole 520. The elastic flat face portion 293a extends radially outward of the first open hole 520 from the upper end of the elastic vertical portion 293b on the head portion 291a side of the bolt 291, and is sandwiched between the head portion 291a and the first fastening portion 512. In this embodiment, the second bush 292 for, for example, closing a gap and suppressing slipping is also arranged between the elastic flat face portion 293a and the head portion 291a. The second bush 292 is formed into a circular shape with a diameter larger than the diameter of the head portion 291a, and has an open hole through which the shaft portion 291b can penetrate.

The first bush 294 has a bush vertical portion 294b, which forms a bush open hole 294c through which the shaft portion 291b penetrates, and a bush flat face portion 294a, which extends radially outward from the bush vertical portion 294b. The bush vertical portion 294b has a cylindrical shape and is fitted onto an inner-circumferential face of the elastic open hole 293c. The bush flat face portion 294a extends radially outward of the first open hole 520 from the lower end of the bush vertical portion 294b on the shaft portion 291b side of the bolt 291, and is sandwiched between the first fastening portion 512 and the upper flat face portion 295a of the nut 295.

According to the above configuration, the front panel 250 and the front wheel-side panel 260 are fastened to each other as a result of the fastening member 290 being inserted into the first fastening portion 512 of the front panel 250 and the second fastening portion 612 of the front wheel-side panel 260, and the first fastening portion 512 and the second fastening portion 612 being held from two opposite sides. The first fastening portion 512 and the second fastening portion 612 are more firmly fixed by the fastening member 290 as a result of the first bush 294 being fitted into the gap 514 formed between the first fastening portion 512 and the second fastening portion 612.

In this case, the gap 514 into which the first bush 294 is fitted is formed due to the first fastening portion 512 bulging toward the side opposite to the second fastening portion 612, and the thickness T1 of the first fastening portion 512 is greater than or equal to the thickness T2 of the first edge portion 510 at the periphery of the first fastening portion 512. Accordingly, a decrease in the rigidity of the first fastening portion 512 can be suppressed even if the first bush 294 is fitted into the gap 514 between the first fastening portion 512 and the second fastening portion 612.

For example, in the case where the first fastening portion 512 is formed to have a small thickness in order to form the gap 514, stress is likely to concentrate at the thin portion due to being held from two opposite sides by the fastening member 290, and there is a likelihood that the first fastening portion 512 and the first edge portion 510 at the periphery thereof will break, for example. In this embodiment, the rigidity of the first fastening portion 512 can be increased by making the thickness T1 of the first fastening portion 512 greater than or equal to the thickness T2 of the first edge portion 510 at the periphery thereof. In addition, concentration of stress at the first fastening portion 512 can be suppressed.

According to the above configuration, the shape in a plan view of the first open hole 520 in the front panel 250 is formed with the first circular portion 521, which has a circular shape, and the first communicating portion 523, which is open to the end face of the first edge portion 510. The shaft portion 291b of the fastening member 290 is inserted into the first circular portion 521. Since the width of the first communicating portion 523 is smaller than that of the first circular portion 521, the shaft portion 291b that has been inserted into the first circular portion 521 can be kept from withdrawing from the opening in the end face of the first edge portion 510 via the first communicating portion 523. As a result, the front panel 250 and the front wheel-side panel 260 can be firmly fixed.

Similarly, since the width of the second communicating portion 623 is smaller than that of the second circular portion 621, the shaft portion 291b that has been inserted into the second circular portion 621 can be kept from withdrawing from the opening in the end face of the second edge portion 610 via the second communicating portion 623. As a result, the front panel 250 and the front wheel-side panel 260 can be firmly fixed.

According to the above configuration, the first bush 294, through which the shaft portion 291b of the bolt 291 penetrates, is arranged in the gap 514 between the first fastening portion 512 and the second fastening portion 612. The first bush 294 functions as a buffer material for closing a gap that is formed when the first fastening portion 512 and the second fastening portion 612 are fastened via the bolt 291 and the nut 295, suppressing slipping at the time of fastening, and diffusing stress at the time of fastening, for example.

According to the above configuration, the shaft portion 291b of the bolt 291 penetrates the elastic member 293, which is fitted into the first open hole 520. Thus, force that is applied to the shaft portion 291b can be diffused and reduced using the elasticity of the elastic member 293, compared with the case where the shaft portion 291b comes into direct contact with the first open hole 520 in the front panel 250. For example, in the case where force is applied to the front panel 250 and the front wheel-side panel 260 such that they move in different directions, shearing stress acts on the shaft portion 291b, but the shearing stress can be reduced to suppress distortion, breakage, or the like of the shaft portion 291b by the elastic member 293.

Furthermore, according to the above configuration, the elastic vertical portion 293b of the elastic member 293 is fitted to the inner-circumferential face of the first open hole 520. In addition, the elastic flat face portion 293a extends in the radial direction of the first open hole 520 on the head portion 291a side of the bolt 291. Thus, the elastic member 293 has an L shape as viewed in a cross-sectional view and is locked to the first fastening portion 512. The bush vertical portion 294b of the first bush 294 is fitted to the inner-circumferential face of the elastic open hole 293c. The bush flat face portion 294a extends radially outward of the first open hole 520 on the shaft portion 291b side of the bolt 291. Thus, the first bush flat 294 has an inverted L shape as opposed to the elastic member 293 as viewed in a cross-sectional view, and is locked to the first fastening portion 512. That is to say, the first fastening portion 512 is sandwiched by the elastic member 293 and the first bush 294. Accordingly, the elastic member 293 and the first bush 294 firmly sandwich the first fastening portion 512 as a result of the bolt 291 and the nut 295 being fastened. Also, the front panel 250 and the front wheel-side panel 260 can be firmly fixed as a result of the nut 295 supporting the second fastening portion 612.

Variations of Third Embodiment (1) In the above embodiment, the first fastening portion 512 has the gap 514 between the first fastening portion 512 and the second fastening portion 612, by being formed to bulge upward. Furthermore, in the above embodiment, the first open hole 520 in the first fastening portion 512 is formed with the first circular portion 521 and the first communicating portion 523, and the second open hole 620 in the second fastening portion 612 is formed with the second circular portion 621 and the second communicating portion 623.

However, at least the first fastening portion 512 need only bulge upward to form the gap 514, and the configuration of the first open hole 520 and the second open hole 620 is not limited to that in the above embodiment. Accordingly, the first open hole 520 does not need to be formed to have the first circular portion 521 and the first communicating portion 523, and may alternatively be formed into a U shape, for example. Similarly, the second open hole 620 does not need to be formed to have the second circular portion 621 and the second communicating portion 623, and may alternatively be formed into a U shape, for example. For this reason, for example, each of the first open hole 520 and the second open hole 620 may optionally employ the configuration in the above embodiment, or may alternatively be formed to have another shape, e.g. a U shape.

For example, a configuration may alternatively be employed in which the first fastening portion 512 is formed to bulge upward and has the gap 514, furthermore, the first open hole 520 is formed to have the first circular portion 521 and the first communicating portion 523, and the second open hole 620 is formed to have a U shape.

(2) In the above embodiment, the fastening member 290 has the second bush 292, the elastic member 293, and the first bush 294, each of which serves as the interposed member. However, the fastening member 290 need only at least have the first bush 294, and does not need to have at least either the elastic member 293 or the second bush 292.

In the above embodiment, the first bush 294 has the bush flat face portion 294a and the bush vertical portion 294b. However, the first bush 294 may alternatively be constituted only by the bush flat face portion 294a.

In the above embodiment, the elastic member 293 has the elastic flat face portion 293a and the elastic vertical portion 293b. However, the elastic member 293 may alternatively be constituted only by the elastic vertical portion 293b.

(3) In the above embodiment, the second fastening portion 612 is formed as a result of the second edge portion 610 extending to form a flat plate-like shape. However, the shape of second fastening portion 612 is not limited to a flat plate-like shape, and may alternatively be formed to bulge downward such that the gap 514 between the first fastening portion 512 and the second fastening portion 612 is larger, for example. In this case, the second fastening portion 612 is formed as a flat face that protrudes downward. The second fastening portion 612 may alternatively be formed to bulge upward while keeping the gap 514 between the first fastening portion 512 and the second fastening portion 612. In this case, the second fastening portion 612 is formed as a flat face that protrudes upward.

(4) In the above embodiment, for the connection between the front panel 250 and the front wheel-side panel 260, the first open hole 520 and the second open hole 620, each of which has a predetermined shape as viewed in a plan view and in a cross-sectional view, are provided respectively at the edge portion of the front panel 250 and the edge portion of the front wheel-side panel 260. However, the front panel 250 may also be connected to the vehicle body frame 270 as well as to the front wheel-side panel 260. In this case, a first fastening portion 512 of a first edge portion 510 of the front panel 250 that is connected to the vehicle body frame 270 is configured similarly to the first fastening portion 512 in the above embodiment. An open hole in a fastening portion at an edge portion of the vehicle body frame 270 may be formed to have a U shape as viewed in a plan view, and may be, more preferably, formed to include a circular portion and a communicating portion, similarly to the above embodiment, as viewed in a plan view.

(5) In the above embodiment, the front wheel-side panel 260 is arranged corresponding to the front wheel-side space 219 in which the front wheel driving mechanism 280 for driving the front wheels 201 is arranged. The front wheel-side panel 260 is arranged substantially in the vertical direction. The front panel 250 and the front wheel-side panel 260 are connected and fixed to each other as a result of the second fastening portion 612 provided at the second edge portion 610 of the front wheel-side panel 260 and the first fastening portion 512 provided at the first edge portion 510 of the front panel 250 being fastened to each other by the fastening member 290. However, the direction in which the plate-shaped face of the front wheel-side panel 260 extends is not limited to the vertical direction. For example, the plate-shaped face of the front wheel-side panel 260 may alternatively be arranged while extending substantially in the front-rear direction, and may be connected to the front panel 250, in a state of being arranged in the front-rear direction.

What is claimed is:

1. A work vehicle comprising:
   a traveling vehicle body;
   a front guard comprising a guard body portion extending in a lateral direction, a first upper auxiliary guard portion, a second upper auxiliary guard portion, at least one lower auxiliary guard portion, and a lateral support portion extending in the lateral direction, the front guard configured to protect the traveling vehicle body, the front guard being provided at a front end portion of the traveling vehicle body; and
   an auxiliary device capable of being attached to and removed from the front guard,
   wherein the first upper auxiliary guard portion and the second upper auxiliary guard portion extend from the guard body portion in a first direction to form loop shapes on opposing sides of the guard body portion,
   wherein the at least one lower auxiliary guard portion extends from the guard body portion in a second direction, opposite the first direction, to form a loop shape,
   wherein the lateral support portion comprises at least one face portion and at least one reinforcing rib extending over the at least one face portion, and
   wherein the front guard is provided with an attachment portion to which the auxiliary device can be attached and from which the auxiliary device can be removed.

2. The work vehicle according to claim 1 wherein the auxiliary device is a front bumper that is made of a buffer material.

3. The work vehicle according to claim 1, wherein the auxiliary device is a direction indicator configured to indicate a direction in which the traveling vehicle body turns.

4. The work vehicle according to claim 1, wherein the auxiliary device is a work lamp.

5. The work vehicle according to claim 1, wherein the auxiliary device is an under guard configured to protect a lower portion of the traveling vehicle body.

6. The work vehicle according to claim 1, wherein the auxiliary device is a bush guard configured to guide weeds toward a vehicle body lower side.

7. The work vehicle according to claim 1, wherein the auxiliary device is at least two of a front bumper that is made of a buffer material, a direction indicator configured to indicate a direction in which the traveling vehicle body turns, a work lamp, an under guard configured to protect a lower portion of the traveling vehicle body, and a bush guard configured to guide weeds toward a vehicle body lower side.

* * * * *